US012641501B2

(12) United States Patent
Teyeb et al.

(10) Patent No.: US 12,641,501 B2
(45) Date of Patent: May 26, 2026

(54) SELF ORGANIZING NETWORK REPORT HANDLING IN MOBILE INTEGRATED ACCESS AND BACKHAUL SCENARIOS

(71) Applicant: Telefonaktiebolaget LM Ericsson (PUBL), Stockholm (SE)

(72) Inventors: Oumer Teyeb, Montréal (CA); Pradeepa Ramachandra, Linköping (SE); Mattias Bergström, Sollentuna (SE); Angelo Centonza, Torrenueva Costa Granada (ES); Marco Belleschi, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 572 days.

(21) Appl. No.: 18/004,697

(22) PCT Filed: Jul. 9, 2021

(86) PCT No.: PCT/EP2021/069237
§ 371 (c)(1),
(2) Date: Jan. 9, 2023

(87) PCT Pub. No.: WO2022/008752
PCT Pub. Date: Jan. 13, 2022

(65) Prior Publication Data
US 2023/0269634 A1      Aug. 24, 2023

Related U.S. Application Data

(60) Provisional application No. 63/050,231, filed on Jul. 10, 2020.

(51) Int. Cl.
*H04W 36/00* (2009.01)
*H04W 84/18* (2009.01)

(52) U.S. Cl.
CPC ................. *H04W 36/0079* (2018.08); *H04W 36/008375* (2023.05); *H04W 84/18* (2013.01)

(58) Field of Classification Search
None
See application file for complete search history.

(56) References Cited

U.S. PATENT DOCUMENTS 8,208,924 B2 * 6/2012 Han .................. H04W 36/0085
                                                        455/423
2013/0286851 A1 * 10/2013 Moser .................. H04W 88/10
                                                        370/241.1
(Continued)

FOREIGN PATENT DOCUMENTS

CN          110536351 A      12/2019
WO     2020 051588 A1       3/2020

OTHER PUBLICATIONS

PCT Notification of Transmittal of the International Search Report and the Written Opinion of the International Searching Authority, or the Declaration issued for International application No. PCT/EP2021/069237—Nov. 9, 2021.

(Continued)

*Primary Examiner* — Willie J Daniel, Jr.
(74) *Attorney, Agent, or Firm* — Baker Botts L.L.P.

(57)          ABSTRACT

A method performed by a first network node includes obtaining information associated with a Self Organizing Network (SON) report associated with a wireless device. The first network node determines that the information associated with the SON report is associated with a cell that is not served by the first network node. In response to determining that the information associated with the SON report is associated with the cell that is not served by the first network node, the first network node takes at least one action (Continued)

IAB-DU/IAB-Donor DU or IAB-MT
Transmitting part of BAP sublayer

IAB-MT or IAB-DU/IAB-Donor-DU
Receiving part of BAP sublayer

From receiving part of BAP sublayer on same node

From upper layers (IAB-donor DU and IAB-MT only)

To upper layers (IAB)-donor DU and IAB-MT only)

To transmitting part of BAP sublayer on same node

Determine BAP address and Path ID

Add BAP header

Routing

Mapping to BH RLC channel

Remove BAP header

Determine if to deliver to upper layers or to deliver to the transmitting part of the BAP sublayer Egress BH RLC channel Ingress BH RLC channel that includes deleting the information and/or transmitting the information to a second network node.

10 Claims, 29 Drawing Sheets

(56)                    References Cited

U.S. PATENT DOCUMENTS

2020/0100124 A1      3/2020  Hampel et al.
2021/0195675 A1*     6/2021  Park ...................... H04W 88/14

OTHER PUBLICATIONS

3GPP TSG-RAN WG2 Meeting #109bis-e; Electronic; Title: Discussion on IAB BH RLF handling; Source: ZTE, Sanechips (R2-2002855)—Apr. 20-30, 2020.
3GPP TSG-RAN WG2 Meeting #106; Reno, NV, USA, May 13-17, 2019; Agenda Item: 11.1.5 (NR_IAB-Core); Source: LG Electronics Inc.; Title: BH RLF reporting to IAB donor node (R2-1907958 (resubmission of R2-1905072)).
Search Report issued for Chinese Patent Application No. 2021800623087—Jun. 4, 2025.
Notice of First Review issued for Chinese Patent Application No. 202180062308.7—Jun. 6, 2025.

* cited by examiner

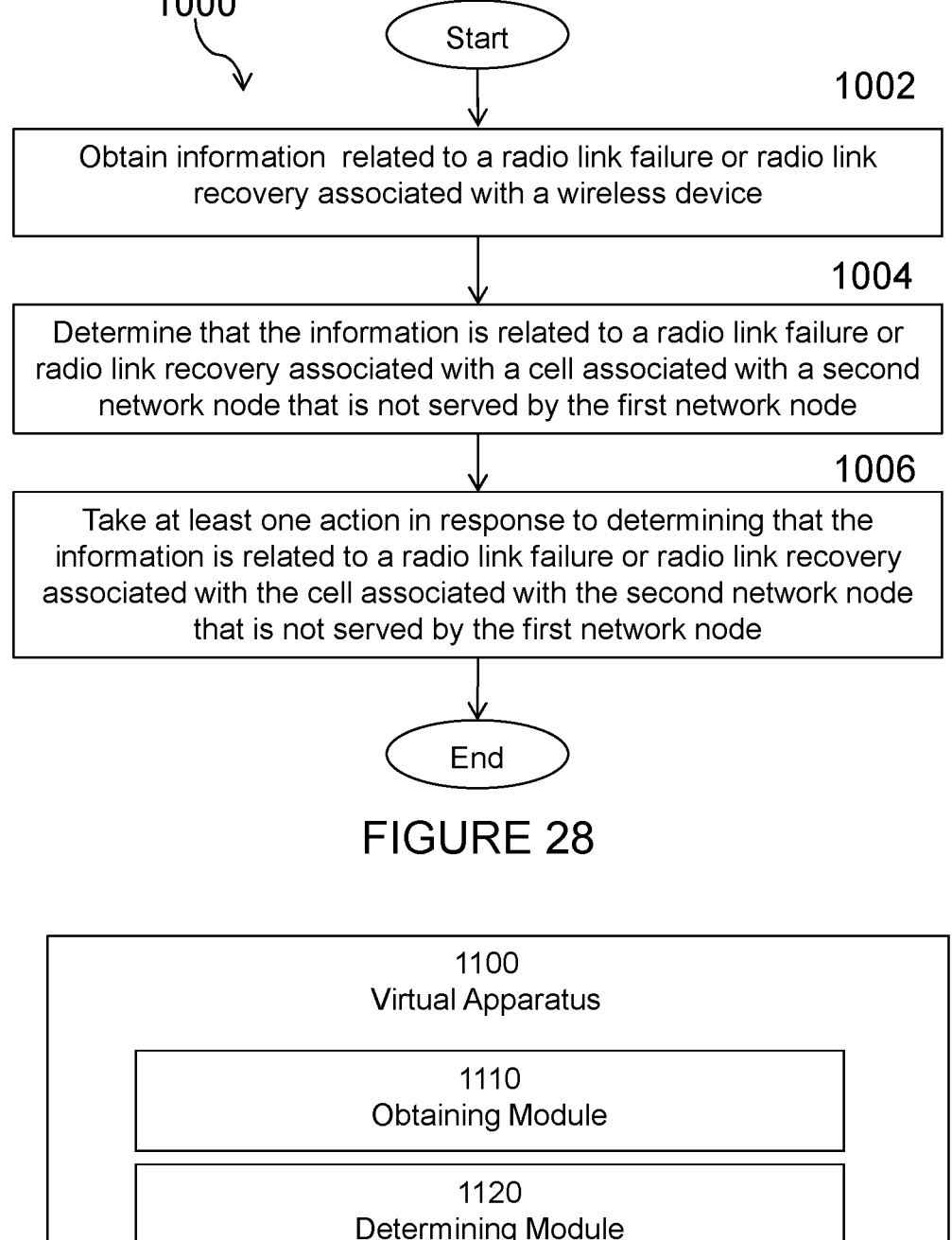

1000

Start

1002

Obtain information related to a radio link failure or radio link recovery associated with a wireless device

1004

Determine that the information is related to a radio link failure or radio link recovery associated with a cell associated with a second network node that is not served by the first network node

1006

Take at least one action in response to determining that the information is related to a radio link failure or radio link recovery associated with the cell associated with the second network node that is not served by the first network node End

FIGURE 28

1100
Virtual Apparatus

1110
Obtaining Module

1120
Determining Module

1130
Taking Action Module

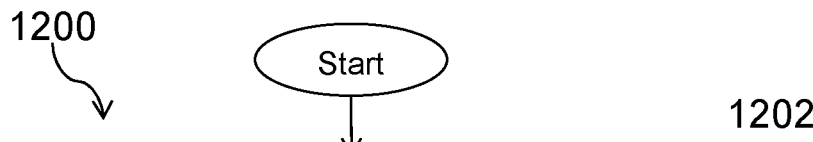

1202

Receive information related to a radio link failure or radio link recovery associated with a wireless device, the information being received from a second network node that is currently serving the wireless device, the information being associated with a cell associated with a third network node that previously served the wireless device, the third network node not being served by the second network node

1204

Take at least one action with respect to the information

End

FIGURE 30

1300
Virtual Apparatus

1310
Receiving Module

1320
Taking Action Module

FIGURE 31

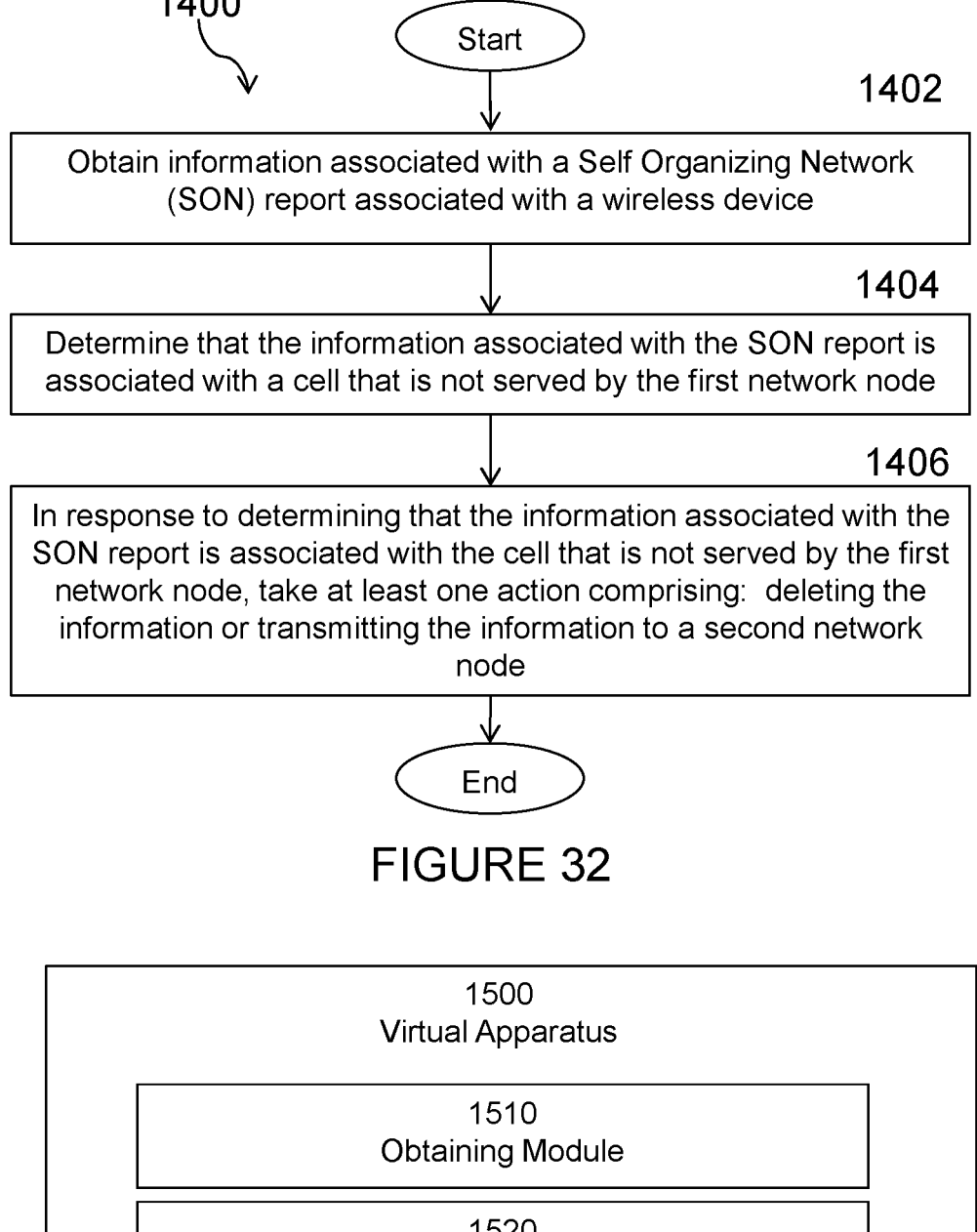

1400

Start

1402

Obtain information associated with a Self Organizing Network (SON) report associated with a wireless device

1404

Determine that the information associated with the SON report is associated with a cell that is not served by the first network node

1406

In response to determining that the information associated with the SON report is associated with the cell that is not served by the first network node, take at least one action comprising: deleting the information or transmitting the information to a second network node End

FIGURE 32

1500
Virtual Apparatus

1510
Obtaining Module

1520
Determining Module

1530
Taking Action Module

FIGURE 33

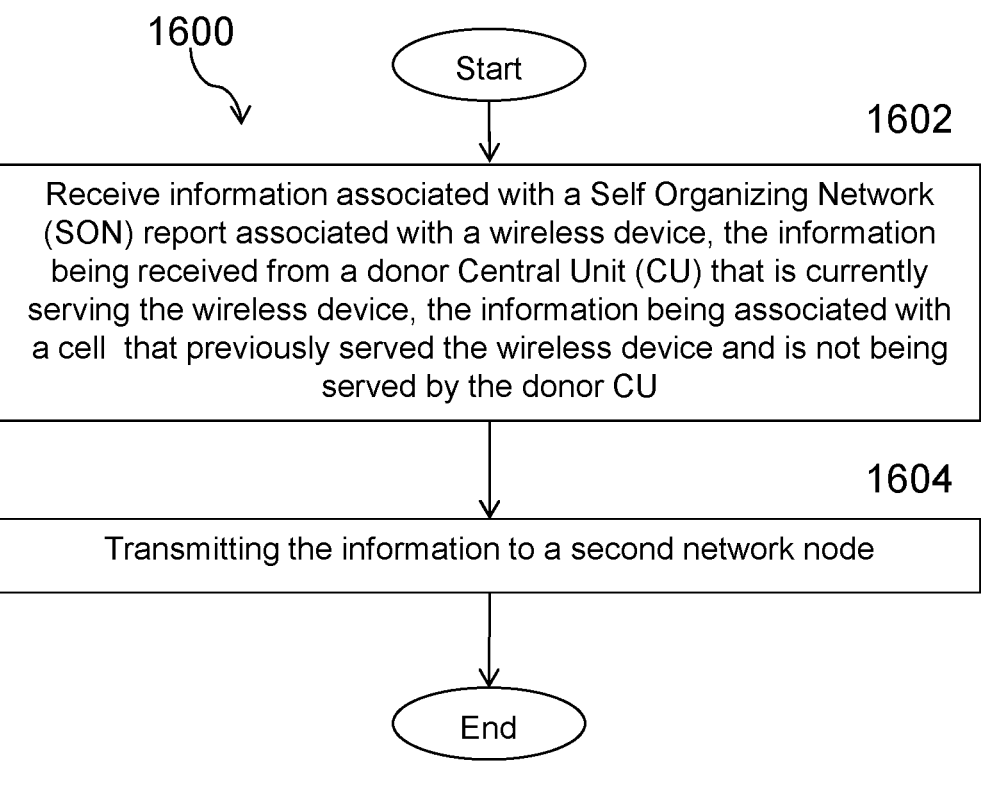

1600

Start

1602

Receive information associated with a Self Organizing Network (SON) report associated with a wireless device, the information being received from a donor Central Unit (CU) that is currently serving the wireless device, the information being associated with a cell that previously served the wireless device and is not being served by the donor CU

1604

Transmitting the information to a second network node

End

FIGURE 34

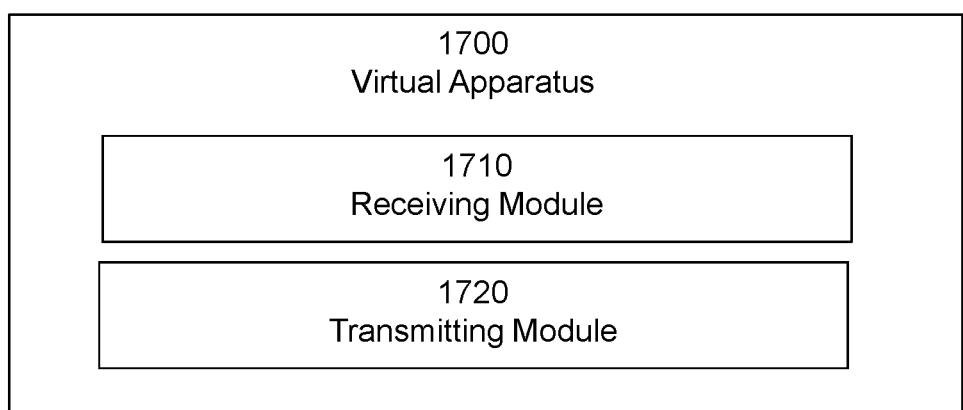

1700
Virtual Apparatus

1710
Receiving Module

1720
Transmitting Module

FIGURE 35

SELF ORGANIZING NETWORK REPORT HANDLING IN MOBILE INTEGRATED ACCESS AND BACKHAUL SCENARIOS

PRIORITY

This nonprovisional application is a U.S. National Stage Filing under 35 U.S.C. § 371 of International Patent Application Serial No. PCT/EP2021/069237 filed Jul. 9, 2021 and entitled "SELF ORGANIZING NETWORK REPORT HANDLING IN MOBILE INTEGRATED ACCESS AND BACKHAUL SCENARIOS" which claims priority to U.S. Provisional Patent Application No. 63/050,231 filed Jul. 10, 2020 both of which are hereby incorporated by reference in their entirety.

TECHNICAL FIELD

The present disclosure relates, in general, to wireless communications and, more particularly, systems and methods for Self Organizing Network (SON) report handling in mobile Integrated Access and Backhaul (IAB) scenarios.

BACKGROUND $3^{rd}$ Generation Partnership Project (3GPP) is currently standardizing integrated access and wireless access backhaul (IAB) in New Radio (NR) in Release 16 (Rel-16).

The usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and Multiple Input Multiple Output (MIMO) support in NR reduce cross-link interference between backhaul and access links allowing higher densification.

During the study item phase of the IAB work, which is discussed in 3GPP TR 38.874, it has been agreed to adopt a solution that leverages the Central Unit (CU)/Distributed Unit (DU) split architecture of NR, where the IAB node will be hosting a DU part that is controlled by a CU. The IAB nodes also have a Mobile Termination (MT) part that they use to communicate with their parent nodes.

The specifications for IAB strives to reuse existing functions and interfaces defined in NR. In particular, MT, gNodeB-Distributed Unit (gNB-DU), gNodeB-Central Unit (gNB-CU), User Plane Function (UPF), Access and Mobility Management Function (AMF), and Session Management Function (SMF) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the IAB node. As used herein, MT is referred to as a function residing on an IAB-node that terminates the radio interface layers of the backhaul Uu interface toward the IAB-donor or other IAB-nodes.

FIG. 1 illustrates a high-level architectural view of an IAB network. Specifically, FIG. 1 illustrates IAB in standalone mode, which contains one IAB-donor and multiple IAB-nodes. The IAB-donor is treated as a single logical node that comprises a set of functions such as gNB-DU, gNodeB-Central Unit-Control Plane (gNB-CU-CP), gNodeB-Central Unit-User Plane (gNB-CU-UP) and potentially other functions. In a deployment, the IAB-donor can be split according to these functions, which can all be either collocated or non-collocated as allowed by 3GPP Next Generation-Radio Access Network (NG-RAN) architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user plane protocol stacks for IAB. FIG. 3 illustrates the control plane protocol stacks for IAB.

As shown in FIGS. 2 and 3, the chosen protocol stacks reuse the current CU-DU split specification in Rel-15, where the full user plane F1-U (General Packet Radio Service Tunneling Protocol-User Plane (GTP-U)/User Datagram Protocol (UDP)/Internet Protocol (IP)) is terminated at the IAB node (like a normal DU) and the full control plane F1-C (F1 Application Protocol (F1-AP)/Stream Control Transmission Protocol (SCTP)/IP) is also terminated at the IAB node (like a normal DU). In the above cases, Network Domain Security (NDS) has been employed to protect both User Plane (UP) and Control Plane (CP) traffic (IP Security (IPsec) in the case of UP, and Datagram Transport Layer Security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul Radio Link Control (RLC) channel (and also between ingress and egress backhaul RLC channels in intermediate IAB nodes) to satisfy the end to end Quality of Service (QoS) requirements of bearers.

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 illustrates one example of the functional view of the BAP sublayer. This functional view should not restrict implementation and is based on the radio interface protocol architecture defined in 3GPP TS 38.300. In the example of FIG. 4, the receiving part on the BAP entity delivers BAP Protocol Data Units (PDUs) to the transmitting part on the collocated BAP entity. Alternatively, the receiving part may deliver BAP Service Data Units (SDUs) to the collocated transmitting part. When passing BAP SDUs, the receiving part removes the BAP header and the transmitting part adds the BAP header with the same BAP routing Identifier (ID) as carried on the BAP PDU header prior to removal. Passing BAP SDUs in this manner is, therefore, functionally equivalent to passing BAP PDUs, in implementation.

The following services are provided by the BAP sublayer to upper layers: data transfer.

A BAP sublayer expects the following services from lower layers per RLC entity (for a detailed description see 3GPP TS 38.322): acknowledged data transfer service and unacknowledged data transfer service.

The BAP sublayer supports the following functions: Data transfer; Determination of BAP destination and path for packets from upper layers; Determination of egress BH RLC channels for packets routed to next hop; Routing of packets to next hop; Differentiating traffic to be delivered to upper layers from traffic to be delivered to egress link; and Flow control feedback and polling signalling.

The terms IAB topology adaptation, IAB migration, IAB relocation and IAB handover are used interchangeably to refer to the procedure where an IAB node changes its parent node. IAB topology adaptation can be triggered due to several reasons such as load or radio conditions at the source (overload at parent node or intermediate nodes between the donor CU and the IAB node, bad radio conditions on the backhaul link to the parent node and/or any of the intermediate hops towards the donor DU, etc.). Topology adaptation can be also due to mobility of the IAB node (which indirectly could be considered/treated the same way as topology adaptation due to radio conditions). It should be noted that currently mobile IAB nodes are not supported in 3GPP, but are likely to be considered in future releases.

FIG. 5 illustrates an example of some possible IAB-node migration cases listed in the order of complexity.

In Intra-CU Case (A), the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

The procedural requirements/complexity of Intra-CU Case (B) are the same as that of Intra-CU Case (A). Also, since the new IAB-donor DU (i.e. DU2) is connected to the same L2 network, the IAB-node (e) can use the same IP address under the new donor DU. However, the new donor DU (i.e. DU2) will need to inform the network using IAB-node (e) L2 address in order to get/keep the same IP address for IAB-node (e) by employing some mechanism such as Address Resolution Protocol (ARP).

The Intra-CU Case (C) is more complex than Case (A) as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and Security Gateway (SeGW), and new IP address for the IPsec tunnel between SeGW and IAB-node (e) DU.

Inter-CU Case (D) is the most complicated case in terms of procedural requirements and may needs new specification procedures that are beyond the scope of 3GPP Rel-16.

3GPP Rel-16 has standardized procedure only for intra-CU migration.

During the intra-CU topology adaptation, both the source and the target parent node are served by the same IAB-donor-CU. The target parent node may use a different IAB-donor-DU than the source parent node. The source path may further have common nodes with the target path. FIG. 6 illustrates an example of the topology adaptation procedure, where the target parent node uses a different IAB-donor-DU than the source parent node.

As shown in FIG. 6, the IAB intra-CU topology adaptation procedure includes:

1. The migrating IAB-MT sends a Measurement Report message to the source parent node gNB-DU. This report is based on a Measurement Configuration the migrating IAB-MT received from the IAB-donor-CU before.
2. The source parent node gNB-DU sends an uplink (UL) Radio Resource Control (RRC) MESSAGE TRANSFER message to the IAB-donor-CU to convey the received Measurement Report.
3. The IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic.
4. The target parent node gNB-DU responds to the IAB-donor-CU with a UE CONTEXT SETUP RESPONSE message.
5. The IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.
6. The source parent node gNB-DU forwards the received RRCReconfiguration message to the migrating IAB-MT.
7. The source parent node gNB-DU responds to the IAB-donor-CU with the UE CONTEXT MODIFICATION RESPONSE message.
8. A Random Access (RA) procedure is performed at the target parent node gNB-DU.
9. The migrating IAB-MT responds to the target parent node gNB-DU with an RRCReconfigurationComplete message.
10. The target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These downlink (DL) and uplink (UL) packets belong to the MT's own signalling and data traffic.
11. The IAB-donor-CU configures Backhaul (BH) Radio Link Control (RLC) channels and BAP-layer route entries on the target path between migrating IAB-node and target IAB-donor-DU. This step also includes allocation of Transport Network Layer (TNL) address (es) that is (are) routable via the target IAB-donor-DU. These configurations may be performed at an earlier stage, e.g. right after step 3. The new TNL address(es) is (are) included in the RRCReconfiguration message at step 5.
12. All F1-U tunnels and F1-C are switched to use the migrating IAB-node's new TNL address(es).
13. The IAB-donor-CU sends a User Equipment (UE) CONTEXT RELEASE COMMAND message to the source parent node gNB-DU.

14. The source parent node gNB-DU releases the migrating IAB-MT's context and responds the IAB-donor-CU with a UE CONTEXT RELEASE COMPLETE message.

15. The IAB-donor-CU releases BH RLC channels and BAP routing entries on the source path. The migrating IAB-node may further release the TNL address(es) it used on the source path.

It may be noted that in case that the source route and target route have common nodes, the BH RLC channels and BAP routing entries of those nodes may not need to be released in Step 15. Steps 11, 12 and 15 also have to be performed for the migrating IAB-node's descendant nodes, as follows:

The descendant nodes must also switch to new TNL addresses that are anchored in the target IAB-donor-DU. The IAB-donor-CU may send these addresses to the descendant nodes and release the old addresses via corresponding RRC signalling.

If needed, the IAB-donor-CU configures BH RLC channels, BAP-layer route entries on the target path for the descendant nodes and the BH RLC Channel mappings on the descendant nodes in the same manner as described for the migrating IAB-node in step 11.

The descendant nodes switch their F1-U and F1-C tunnels to new TNL addresses that are anchored at the new IAB-donor-DU, in the same manner as described for the migrating IAB-node in step 12.

Based on implementation, these steps can be performed after or in parallel with the handover of the migrating IAB-node. In Rel-16, in-flight packets in UL direction that were dropped during the migration procedure may not be recoverable.

In upstream direction, in-flight packets between the source parent node and the IAB-donor-CU can be delivered even after the target path is established. On-going downlink data in the source path may be discarded up to implementation. IAB-donor-CU can determine the unsuccessfully transmitted downlink data over the backhaul link by implementation.

FIG. 7 illustrates Radio Link Failure (RLF) due to physical layer problems. It may occur that a User Equipment (UE) loses coverage to the cell that the UE is currently connected to. This could occur in a situation when a UE enters a fading dip, or that a handover was needed as described above, but the handover failed for one or another reason. This is particularly true if the "handover region" is very short, as will be further described below.

The quality of the radio link is typically monitored in the UE such as, for example, on the physical layer, as described in 3GPP TS 38.300, 3GPP TS 38.331 and 3GPP TS 38.133, and summarized here in a very short description.

Upon detection that the physical layer experiences problems according to criteria defined in 3GPP TS 38.133, the physical layer sends an indication to the Radio Resource Control (RRC) protocol of the detected problems (out-of-sync indication). After a configurable number (N310) of such consecutive indications, a timer (T310) is started. If the link quality is not improved (recovered) while T310 is running (i.e. there are no N311 consecutive "in-sync" indications from the physical layer), a radio link failure is declared in the UE, as depicted in FIG. 7.

The relevant timers and counters described above are listed in Table 1 for reference. The UE reads the timer-values from system information broadcasted in the cell. Alternatively, it is possible to configure the UE with UE-specific values of the timers and constants using dedicated signaling, i.e. where specific values are given to specific UEs with messages directed only to each specific UE.

TABLE 1

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE else: initiate the connection re-establishment procedure. If the T310 is kept in SCG, Inform E-UTRAN/NR about the SCG radio link failure by initiating the SCG failure information procedure as specified in 5.7.3. |
| T311 | Upon initiating the RRC connection re-establishment procedure | Upon selection of a suitable NR cell or a cell using another RAT. | Enter RRC_IDLE |
| T313 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure as specified in 5.6.13. |

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |

In NR, the T310 is used for both the Master Cell Group (MCG) and Secondary Cell Group (SCG) (i.e for NR-DC, (NG)EN-DC). However, for the case where the Secondary Node (SN) is running LTE (i.e. LTE-DC, NE-DC), the timer associated with the Primary Secondary Cell (PSCell) is T312.

Now, if T310 expires for Master Cell Group (MCG), and as seen above, the UE initiates a connection re-establishment to recover the ongoing RRC connection. This procedure now includes cell selection by the UE. For example, the RRC CONNECTED UE shall now try to autonomously find a better cell to connect to, since the connection to the previous cell failed according to the described measurements (it could occur that the UE returns to the first cell anyway, but the same procedure is also then executed). Once a suitable cell is selected (as further described in 3GPP TS 38.304), the UE requests to re-establish the connection in the selected cell. It is important to note the difference in mobility behaviour as an Radio Link Failure (RLF) results in UE based cell selection, in contrast to the normally applied network-controlled mobility.

If the re-establishment is successful (which depends, among other things, if the selected cell and the gNB controlling that cell was prepared to maintain the connection to the UE), then the connection between the UE and the gNB can resume.

A failure of a re-establishment means that the UE goes to RRC_IDLE mode and the connection is released. To continue communication, a brand new RRC connection has then to be requested and established.

The reason for introducing the timers T31x and counters N31x described above is to add some freedom and hysteresis for configuring the criteria for when a radio link should be considered as failed (and recovered). This is desirable, since it would hurt the end-user performance if a connection is abandoned prematurely if it turned out that the loss of link quality was temporary, and the UE succeeded in recovering the connection without any further actions or procedures (e.g. before T310 expires, or before the counting reaches value N310).

The procedures for NR radio link failure detection related actions are disclosed in 3GPP TS 38.331.

Certain problems exist, however. For example, consider the scenario depicted in FIG. 8. In this example scenario, the network topology at two different time instances, at time T and T+1 is shown.

At time=T, there are two donors, IAB donor1 and IAB donor2, each having a corresponding CU and DU. There are two IAB nodes, IAB-A and IAB-B, connected to donor 1, and IAB-B is a mobile IAB node. There was a UE connected to IAB-B.

At time=T+1, IAB-A is still connected to donor1 but IAB-B has been handed over from donor-1 to donor2.

Several RLF report related problems result in the scenario depicted in FIG. 8. For example, a first problem is that handover may be too late. Specifically, between time=T and time=T+1 i.e., when the IAB-B was being served by donor1, a UE that was being served by the IAB-B may declare an RLF. The UE then stores the contents of the RLF report amongst which it stores failedPCellId as the cell associated with the DU of IAB-B.

Then the UE performs re-establishment or goes to idle and comes back to connected in a cell. This cell is associated to DU-3 connected to CU-3 which is different from the DUs and IAB donors shown in FIG. 8. DU-3 can be a normal DU, a donor DU, or even a DU of another IAB node.

The CU-3 extracts the RLF report from the UE at a time which is later in time than time=T+1 and based on the failedPCellId stored in the RLF report, the CU-3 sends this RLF report to donor1 (as it can identify that the failedPCellId belongs to the donor1 from its neighbor relations table).

The donor1, based on the contents of the RLF report, realizes that this is a 'too late handover' and wants to forward this RLF report to the associated DU (in the case of FIG. 8, the DU of IAB-B) so that this DU can tune the associated parameters (RLM resource configurations and/or BFR configurations and/or beamforming configurations etc.). However, the donor1 cannot send this RLF report to the DU of IAB-B as IAB-B is not connected to it anymore. FIG. 9 illustrates the first problem when donor1 cannot send the RLF report.

As another example, a second problem may be related to Random Access (RA) report forwarding. Specifically, before and at time=T, a UE that was connected to donor1 via IAB-B and the UE performed multiple (say two) RA procedures towards the IAB-B (e.g. for beam failure recovery purposes). Associated with these RA procedures, the UE would have stored the RA report in the UE variable varRAReport.

However, the UE may be released to Idle more/Inactive state. The UE then comes back to connected at a later point in time, time>T+1, at a cell associated to DU-3, which is in turn connected to CU-3. DU-3 can be a normal DU, a donor DU, or even a DU of another IAB node.

CU-3 fetches the contents of the varRAReport from the UE which now includes information related to three RA procedures (two for the random access procedures procedure to IAB-B and one for the access procedure towards DU-3). CU-3 forwards the part of the RAReport that is related to IAB-B (as identified by the cell information in the report) to donor1. Donor1 wants to forward the RAReport to the IAB-B but IAB-B is not connected to donor1 anymore. FIG. 10 illustrates the second problem related to RA report forwarding.

SUMMARY

Certain aspects of the present disclosure and their embodiments may provide solutions to these or other challenges. For example, according to certain embodiments, one or more methods may be performed by a first network node, serving as a donor node (donor CU) for IAB nodes in an IAB network, to handle the scenario of receiving a report containing information related to previous failures or recoveries of a UE associated to a cell of an IAB node that was previously served by the first network node but not anymore.

According to certain embodiments, a method performed by a first network node includes obtaining information associated with a SON report associated with a wireless device. The first network node determines that the information associated with the SON report is associated with a cell that is not served by the first network node. In response to determining that the information associated with the SON report is associated with the cell that is not served by the first network node, the first network node takes at least one action that includes deleting the information and/or transmitting the information to a second network node.

According to certain embodiments, a first network node includes processing circuitry configured to obtain information associated with a SON report associated with a wireless device. The processing circuitry is configured to determine that the information associated with the SON report is associated with a cell that is not served by the first network node. In response to determining that the information associated with the SON report is associated with the cell that is not served by the first network node, the processing circuitry is configured to take at least one action that includes deleting the information and/or transmitting the information to a second network node.

According to certain embodiments, another method by a first network node includes receiving information associated with a SON report associated with a wireless device. The information is received from a donor CU that is currently serving the wireless device, and the information is associated with a cell that previously served the wireless device and is not being served by the donor CU. The first network node transmits the information to a second network node.

According to certain embodiments, a first network node includes processing circuitry configured to receive information associated with a SON report associated with a wireless device. The information is received from a donor CU that is currently serving the wireless device, and the information is associated with a cell that previously served the wireless device and is not being served by the donor CU. The processing circuitry is configured to transmit the information to a second network node.

Certain embodiments may provide one or more of the following technical advantages. For example, one technical advantage may be that certain embodiments make it possible to send the reports to the right IAB node, even if the IAB node is being relocated from one CU to another.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 28 illustrates an example method by a first network node, according to certain embodiments;

FIG. 29 illustrates an example virtual apparatus, according to certain embodiments;

FIG. 30 illustrates another example method by a first network node, according to certain embodiments;

FIG. 31 illustrates an example virtual apparatus, according to certain embodiments;

FIG. 32 illustrates another example method by a first network node, according to certain embodiments;

FIG. 33 illustrates another example virtual apparatus, according to certain embodiments;

FIG. 34 illustrates an example method;

FIG. 35 illustrates another example virtual apparatus, according to certain embodiments.

DETAILED DESCRIPTION

Figure 1:
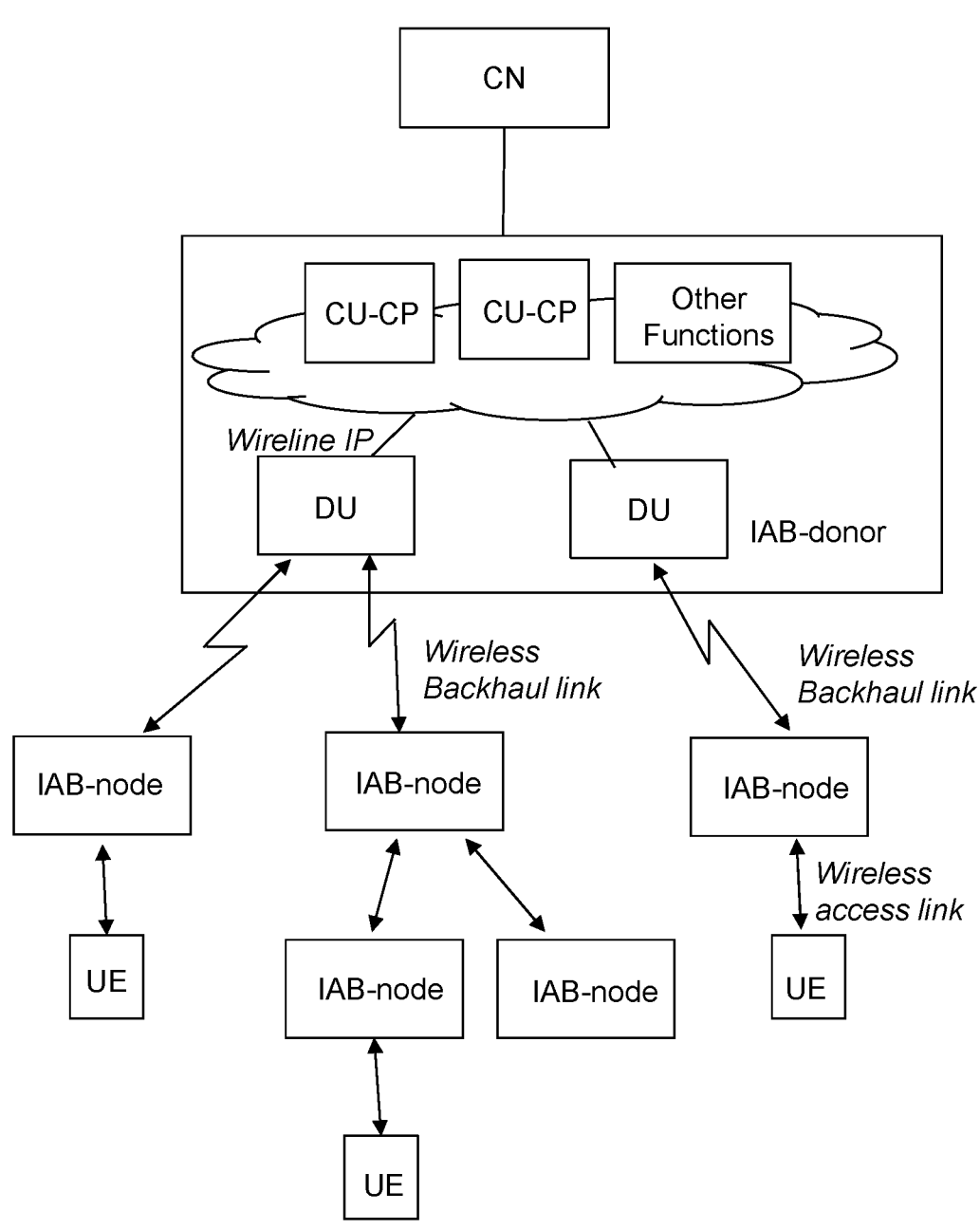
FIG. 1 illustrates a high-level architectural view of an IAB network.
Figure 2:
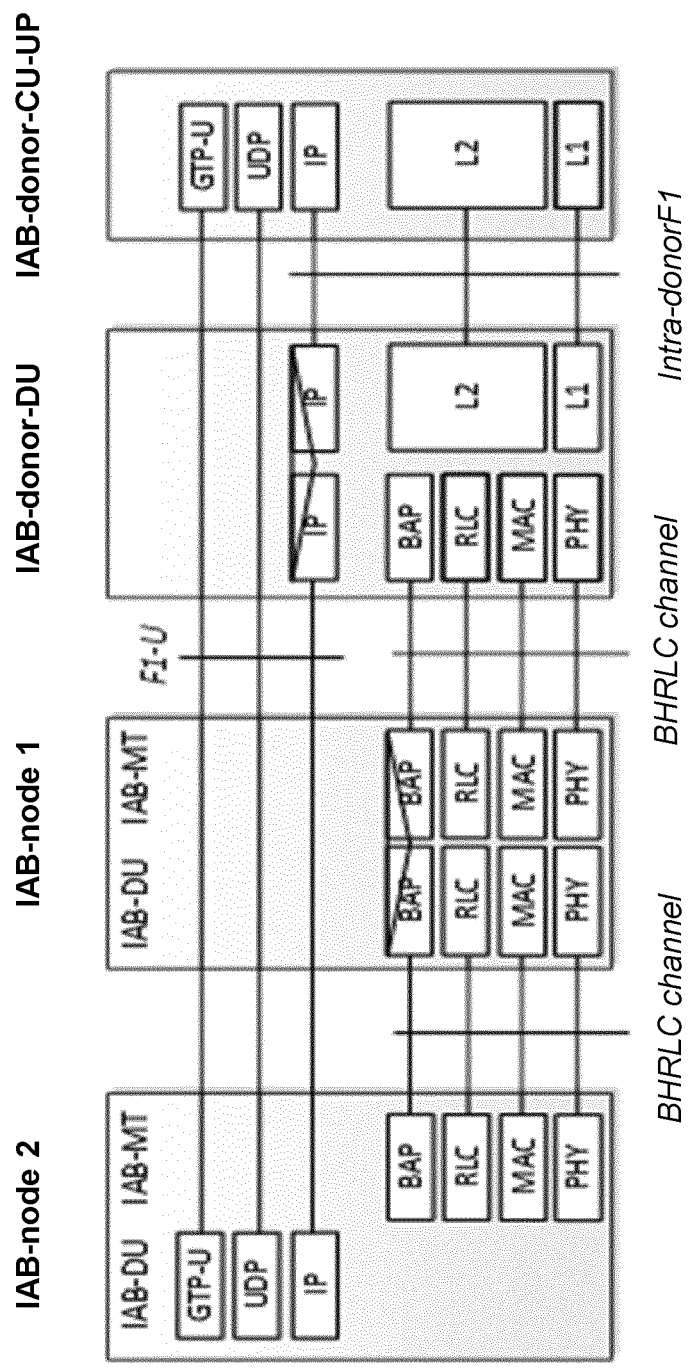
FIG. 2 illustrates the baseline user plane protocol stacks for IAB.
Figure 3:
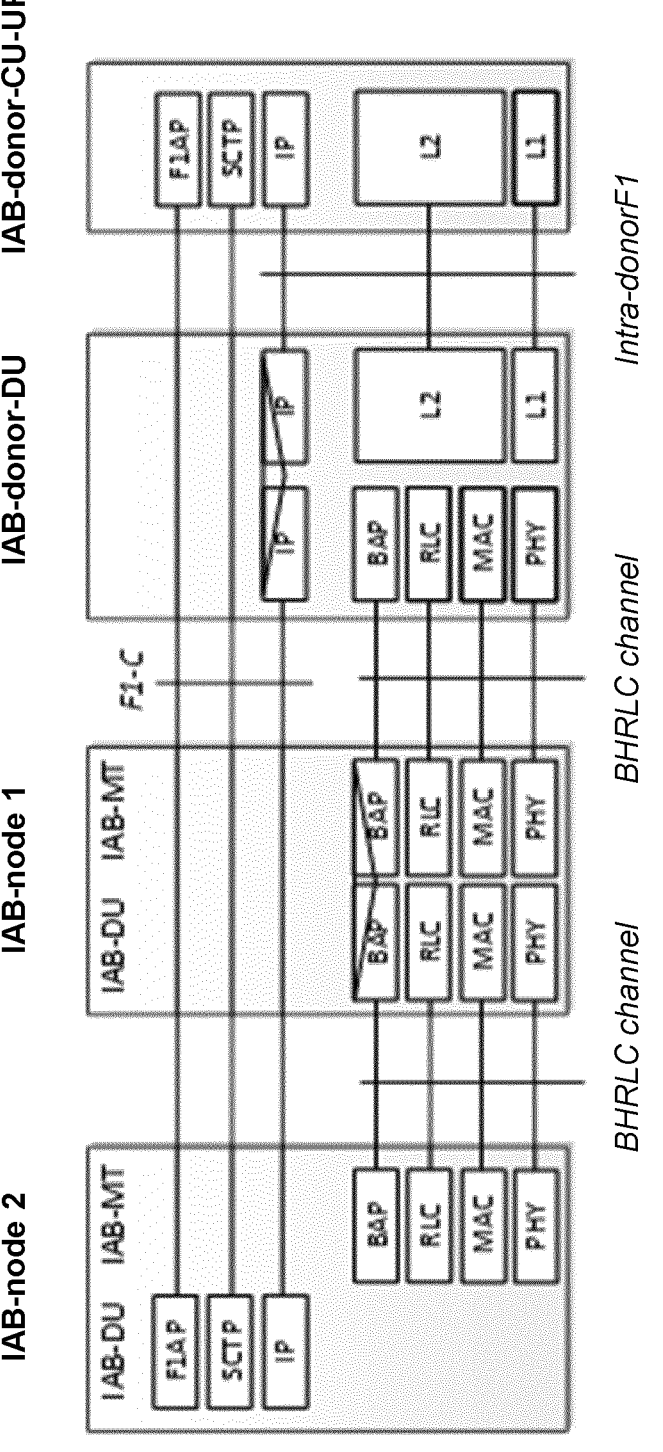
FIG. 3 illustrates the control plane protocol stacks for IAB.
Figure 4:
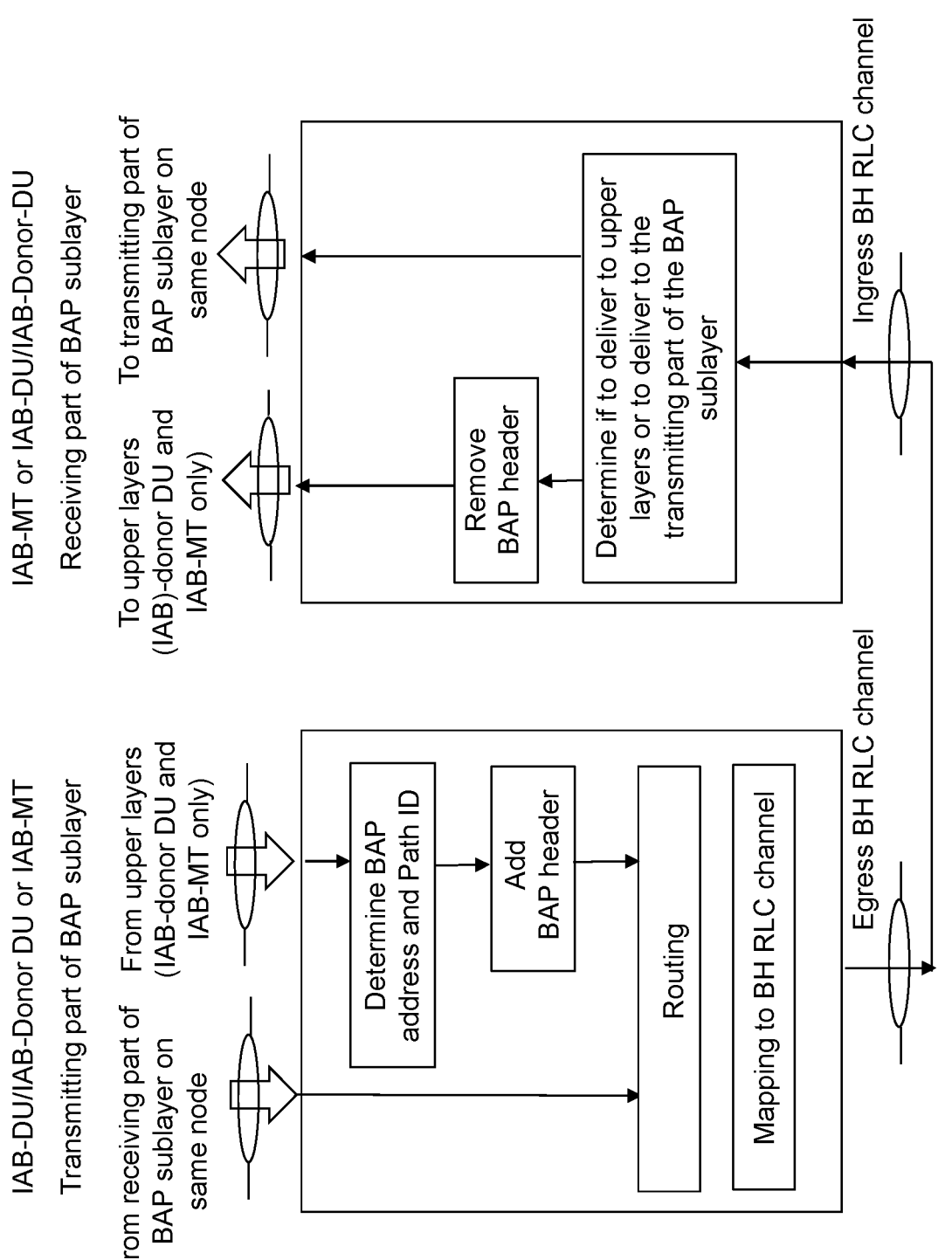
FIG. 4 illustrates one example of the functional view of the BAP sublayer.
Figure 5:
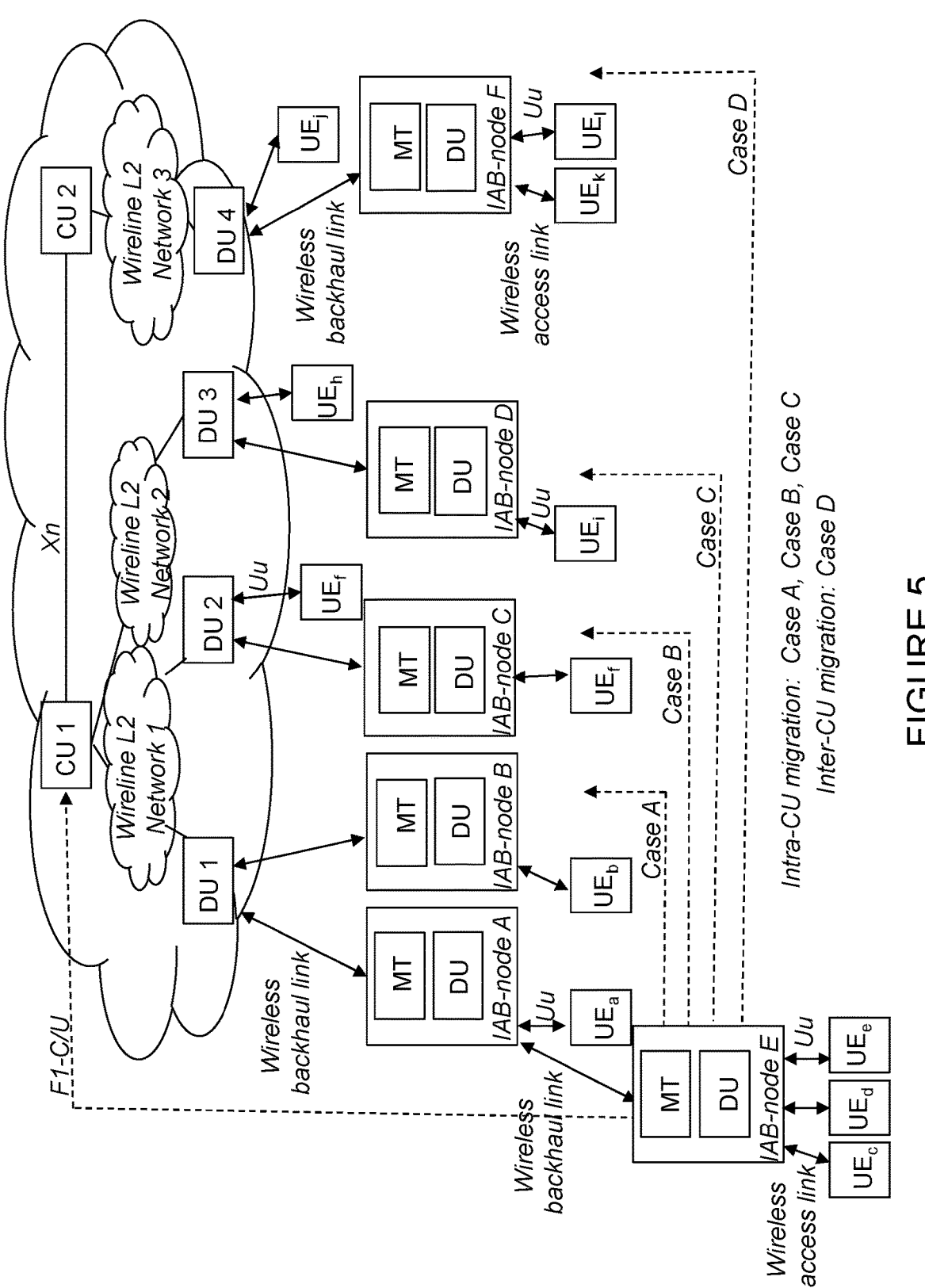
FIG. 5 illustrates an example of some possible IAB-node migration cases listed in the order of complexity.
Figure 6:
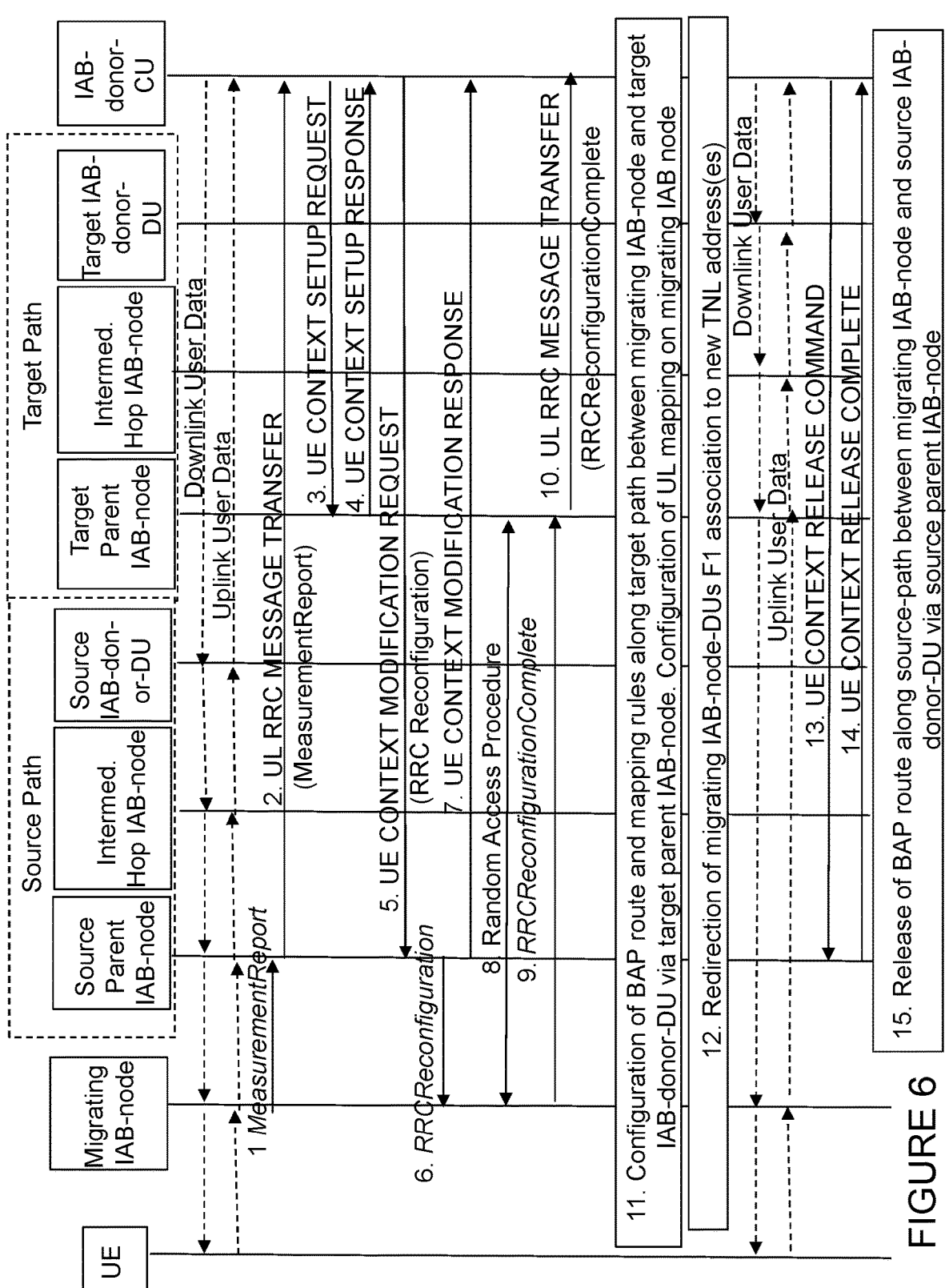
FIG. 6 illustrates an example of the topology adaptation procedure.
Figure 7:
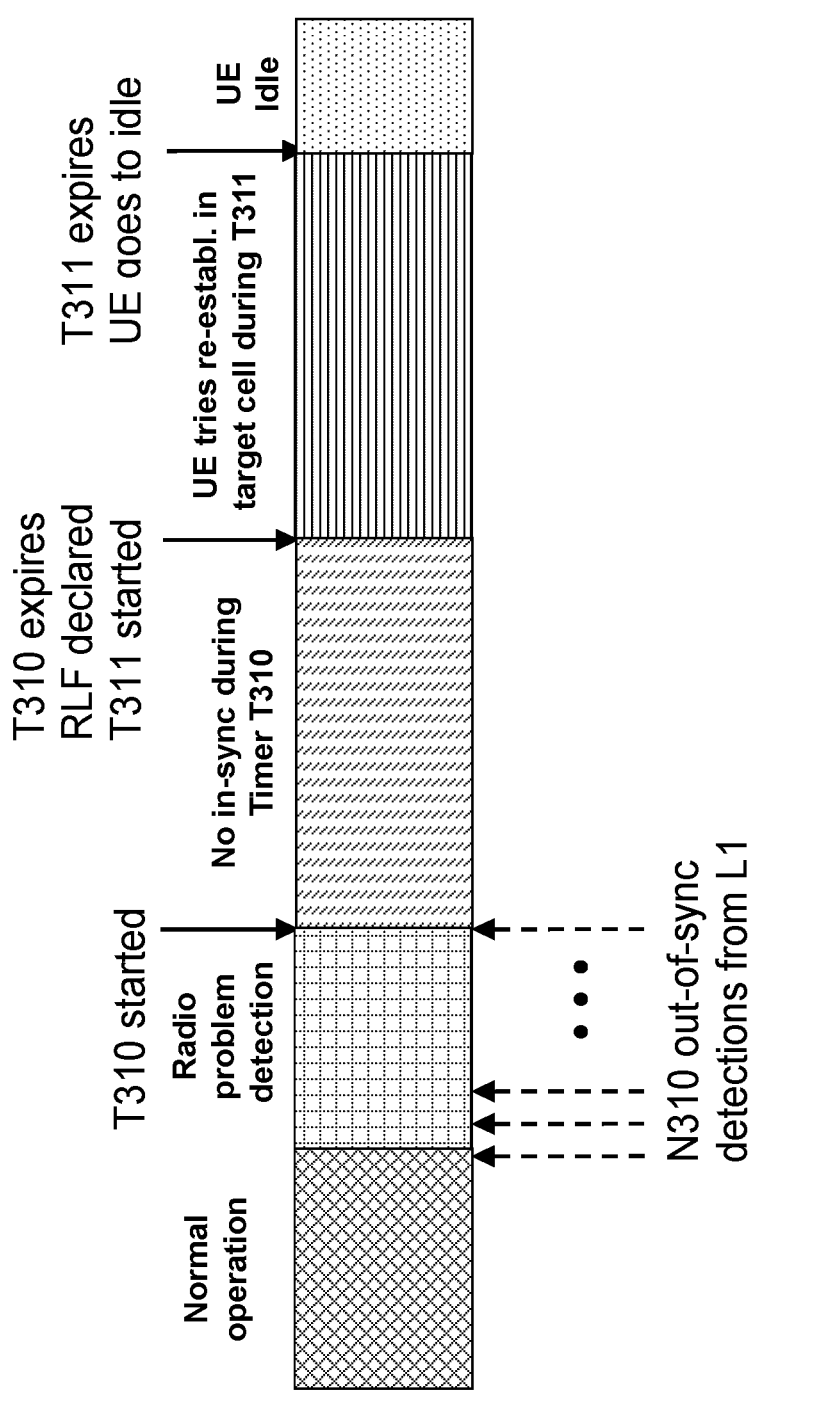
FIG. 7 illustrates RLF due to physical layer problems.
Figure 8:
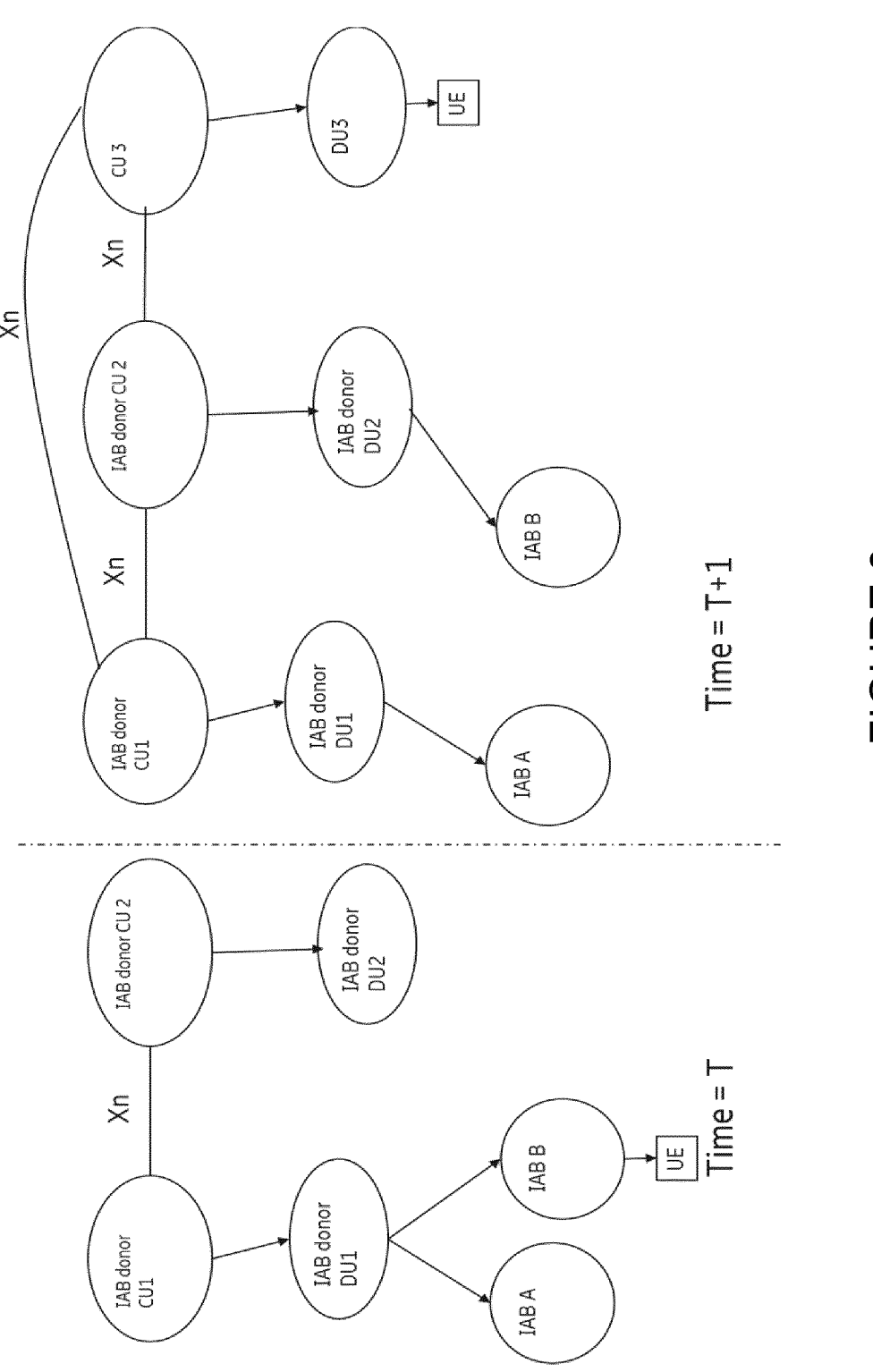
FIG. 8 illustrates an example scenario of a network topology at two different time instances.
Figure 9:
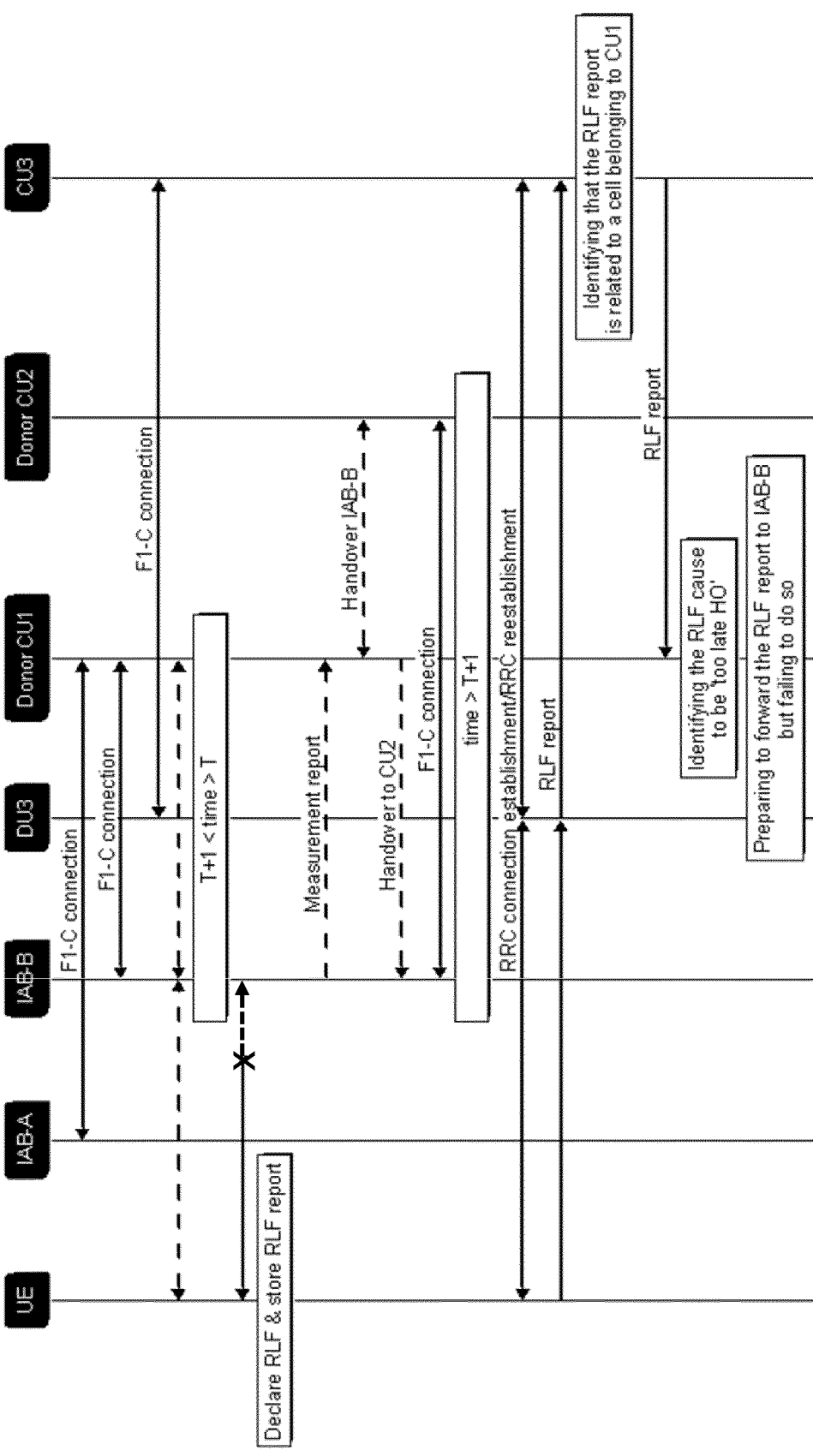
FIG. 9 illustrates a problem when donor1 cannot send the RLF report.
Figure 10:
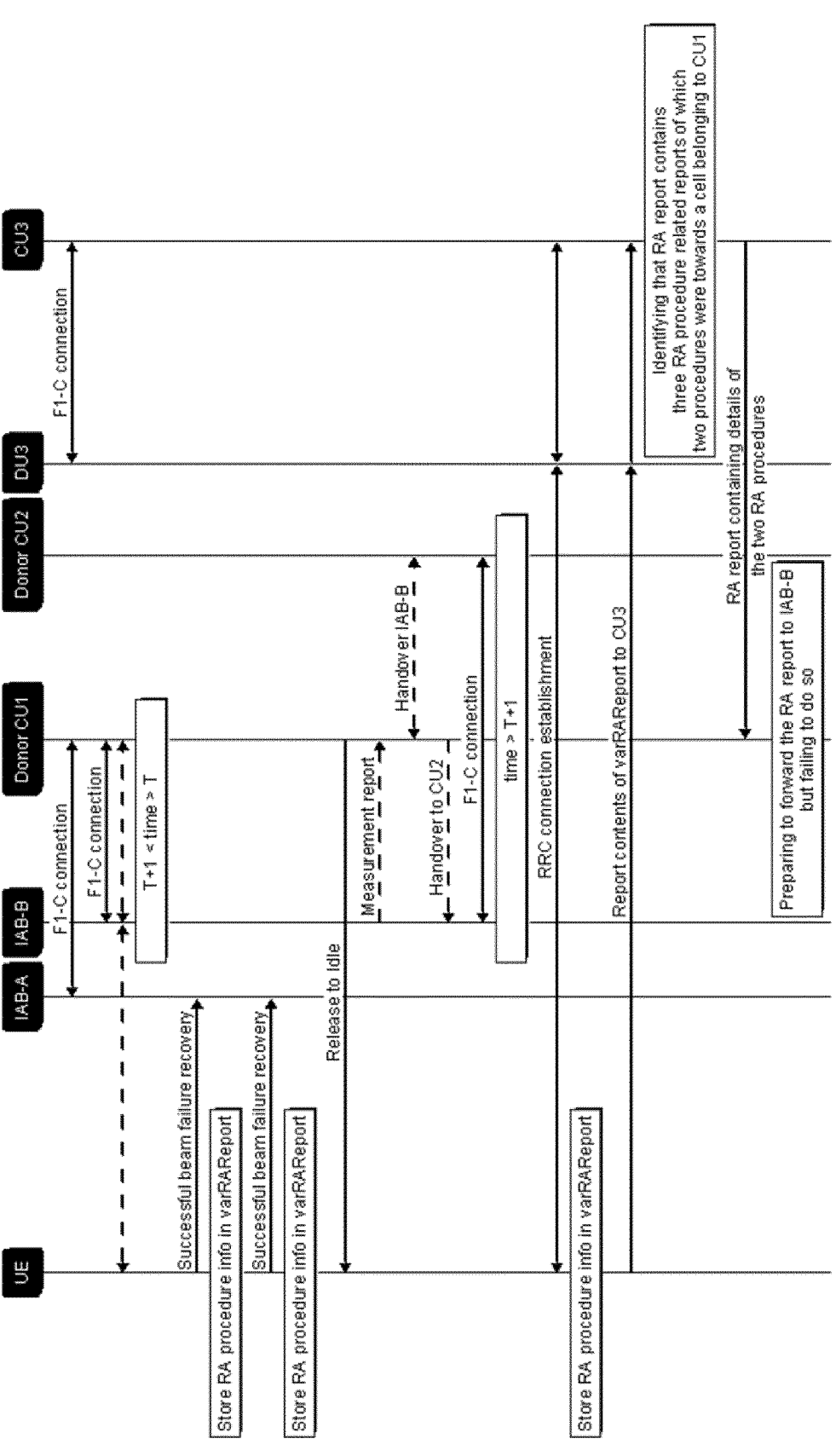
FIG. 10 illustrates a problem related to RA report forwarding.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self Organizing Network (SON), positioning node (e.g. Evolved Serving Mobile Location Center (E-SMLC), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services (ProSe) UE, Vehicle-to-Vehicle (V2V) UE, Vehicle-to-Anything (V2X) UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

In this section, the explanation is provided for Radio Link Failure (RLF) report related aspects but the similar embodiments are also applicable for Random Access (RA) report. The embodiments are actually applicable to any scenario/procedure where reports (e.g. for SON/MDT) are to be sent to the network.

In this section, at some places the explanation is provided with 5G Core (5GC) related terminologies, but the similar embodiments are also applicable for EPC.

The terms mobile-DU and IAB node are used interchangeably.

The UE defined in any of the following solution can be a normal UE or another the MT of an IAB node.

Though the methods, techniques, and solutions herein are described in the context of a mobile IAB node relocating from one donor CU to another due to mobility, the mechanisms are applicable in other scenarios such as static IAB nodes that could be relocated from one donor CU to another due to other reasons like load balancing, or even in a non IAB scenarios where DUs can be relocated from one CU to another.

Various methods and techniques are disclosed in herein that may be performed by a first network node, serving as a donor node (donor CU) for IAB nodes in an IAB network, for example, for handling the scenario of receiving a report containing information related to previous failures or recoveries of a UE associated to a cell of an IAB node that was previously served by the first network node but not anymore.

For example, according to certain embodiments, where a first network node receives a report related to previous failures or recoveries of a UE and determines that the report is associated with a cell of an IAB node that is no more being served by the first node, the method may include the network node performing one or more of the following:

deleting the received report (Embodiment A);

forwarding the received report to the CU that it has previously handed over the concerned IAB node DU to (Embodiment B)

storing the received report and if/when the concerned IAB node is handed over back to the first network at a later point in time, forwarding that report to the IAB node (Embodiment C);

forwarding the RLF/RA reports associated to an IAB donor DU to the OAM, which either just stores or helps to find the current location of the IAB donor DU and forwards the RA/RLF report to it (Embodiment D);

sending the RLF/RA reports associated to an IAB donor DU to the core network node (e.g., AMF/MME) and the core network helps to find the current location of the IAB donor DU and forwards the RA/RLF report to it (Embodiment E);

determining if the cell information is referring to a previous cell identity used by an IAB node that is currently being served by the second node while the IAB node was under a first network node before it was handed over to the second network node, and if so, forwards the report to that IAB node (Embodiment F);

determining, by a second network node, which comprises the CU extracting the RLF/RA report from the UE, i.e. CU-3, whether the cell to which the RLF/RA report refers to is associated to a DU which corresponds to a mobile IAB node (based on the identifiers stored in the RLF/RA report or the RLF/RA report itself has an indications that the respective report is associated to a IAB node), and then determining to discard or the forward to other CUs/DUs the RA/RLF report (Embodiment G, which is similar to embodiment A but the node that fetches the RLF/RA report from the UE itself discards the report compared to embodiment A wherein this RLF/RA report is forwarded to the source CU and then the source CU discards it).

Though the Embodiments are discussed separately, it is recognized that any two or more of the above methods may be combined. More details are provided below with respect to the different particular embodiments.

Completely Discarding the RLF Report (Embodiment A)

Figure 11:
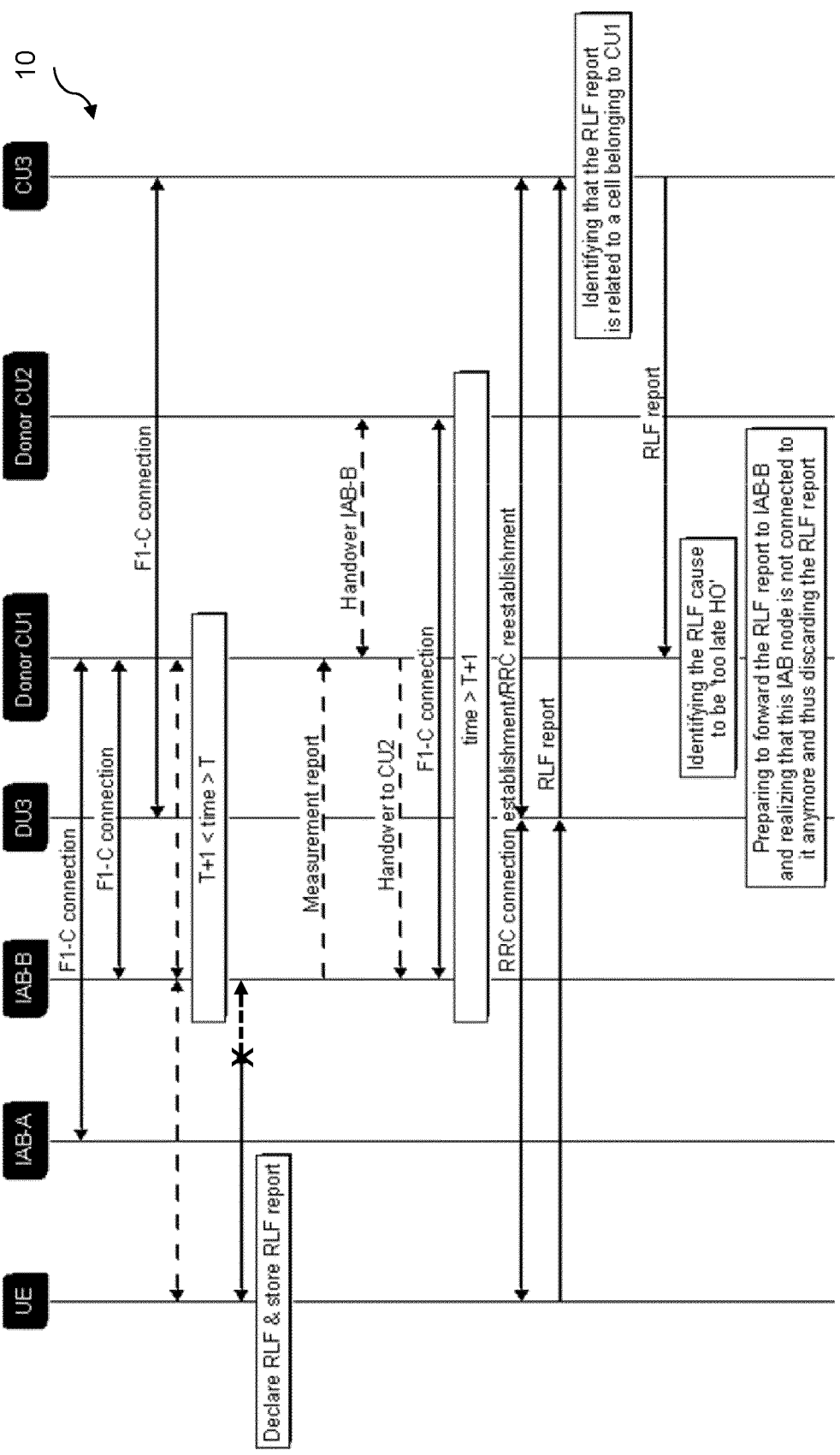
FIG. 11 illustrates an example scenario wherein the IAB donor CU discards the RLF report, according to certain embodiments.

According to certain embodiments, the IAB donor CU that receives the RLF report associated to a cell belonging to a mobile IAB node that is not connected to it anymore may simply discard the RLF report. FIG. 11 illustrates an example scenario 10 wherein the IAB donor CU discards the RLF report.

Forwarding to the Past HO Targets (Embodiment B)

Figure 12:
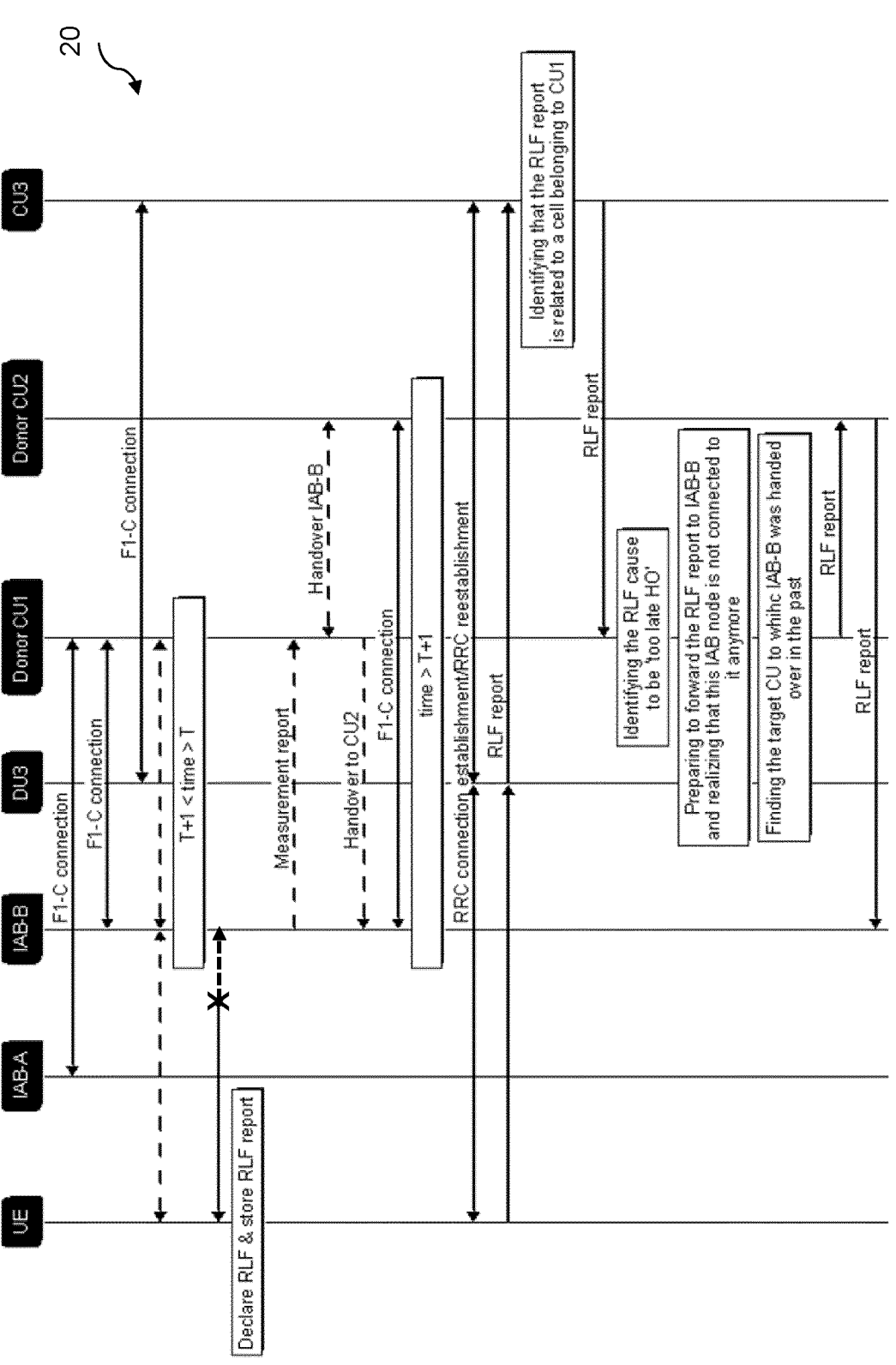
FIG. 12 illustrates an example scenario wherein the IAB donor CU forwards the RLF report to past handover targets, according to certain embodiments.

According to certain embodiments, the source IAB donor CU that receives the RLF report via RLF indication message from another CU forwards it to the CU to which the source IAB donor CU had handed over this mobile IAB node to. For example, FIG. 12 illustrates an example scenario 20 wherein the IAB donor CU forwards the RLF report to past HO targets.

For Embodiment B to work, the first network node has to store the outgoing handover history of its IAB nodes (e.g. cells identifiers of the IAB node being handed over, identity of the CU towards which the IAB was handed over, etc.). Accordingly, the scenario depicted in FIG. 12 may require each IAB donor node to remember the target CUs to which a given mobile IAB node is handed over. This way of remembering the target CU information can be based on a timer duration wherein upon the expiry of the timer, the source IAB donor discards any further RLF/RA report that is received in relation to the said mobile IAB node (e.g. as in Embodiment A above).

In a particular embodiment, if the IAB node has been relocated to yet another node, the RLF report may be propagated from one CU to another until the CU where the IAB node is currently located in.

Storing the Report and Sending it to the IAB Node when the IAB Node Comes Back to the Same CU (Embodiment C)

Figure 13:
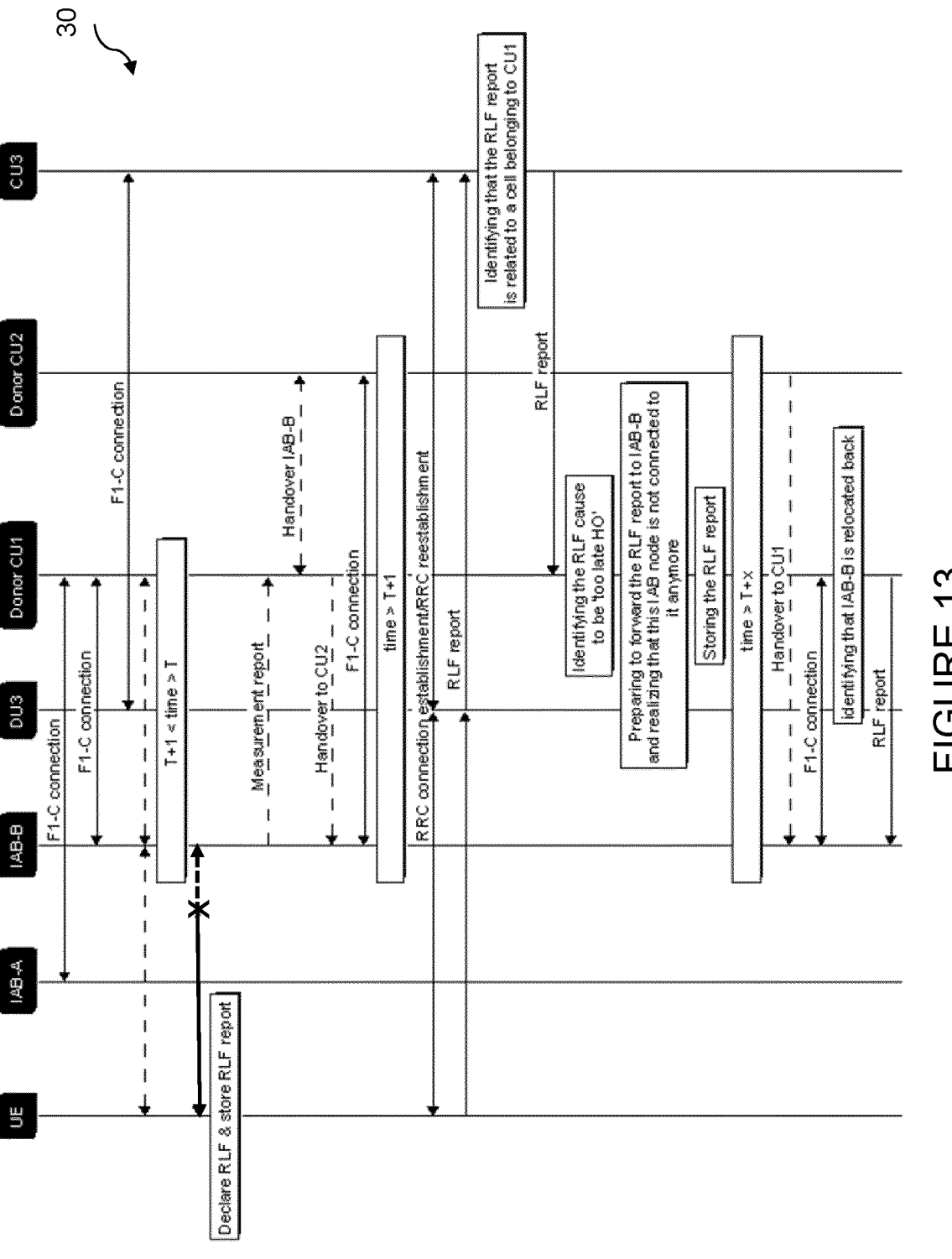
FIG. 13 illustrates an example scenario wherein the IAB donor CU stores the report and sends it to the IAB node when the IAB node comes back to the same CU.

According to certain embodiments, the source IAB donor CU that receives the RLF report via RLF indication message from another CU stores it in its internal memory and when the said mobile IAB node comes back to the same IAB donor CU, the RLF report is forwarded to the said IAB node. For example, FIG. 13 illustrates an example scenario 30 wherein the IAB donor CU stores the report and sending it to the IAB node when the IAB node comes back to the same CU.

In a particular embodiment, this may be based on a timer wherein the source donor CU starts the timer when it receives the said RLF report via RLF indication message from another CU and when it recognizes that the IAB node, towards which this RLF report should be forwarded to, is not connected to it anymore. Upon expiry of this timer, the source donor CU can take one of the actions as specified in the embodiments related to Embodiment A.

There are several ways in which the an IAB donor CU may identify the IAB node. In one particular embodiment, for example, each IAB donor DU has a unique identifier (e.g. identifier assigned by OAM), which can be communicated to the donor CU (e.g. when the IAB node establishes an F1 connection, in the F1 Setup Request message). Based on this, the IAB donor CU can identify if the same IAB node has connected to it now compared to past connections. In another particular embodiment, each IAB donor CU has a unique identifier (e.g. identifier assigned by OAM), which can be communicated to the IAB donor DU (e.g. when the IAB node establishes an F1 connection, in the F1 Setup Response message). Based on this the IAB donor DU can identify if it is connected to the same IAB donor CU compared to past connections and if so, it can initiate a RA report/RLF report fetch request from such a IAB donor CU.

According to various particular embodiments, the identifiers related to the IAB donor DU may include:

gNB-DU ID or gNB-DU Name, which are typically configured by OAM, and communicated to the CU in legacy F1 Setup Request message;

Transport layer (IP address) of the IAB node (which the CU can identify from the source IP address of the IP packet carrying the F1 Setup request message);

BAP address of the IAB node; and/or

A new identifier introduced for this purpose.

According to various embodiments, the identifiers related to the IAB donor CU may include:

gNB-CU Name, which are typically configured by OAM, and communicated to the IAB node in legacy F1 Setup Response message;

Transport layer (IP address) of the IAB donor CU (which the IAB node has to know in order to send the F1 Setup request message, e.g. communicate to the IAB node in the handover command);

BAP address of an IAB donor DU that is connected to an IAB donor CU; and/or

A new identifier introduced for this purpose.

Using OAM to Forward the RLF Report (Embodiment D)

Figure 14:
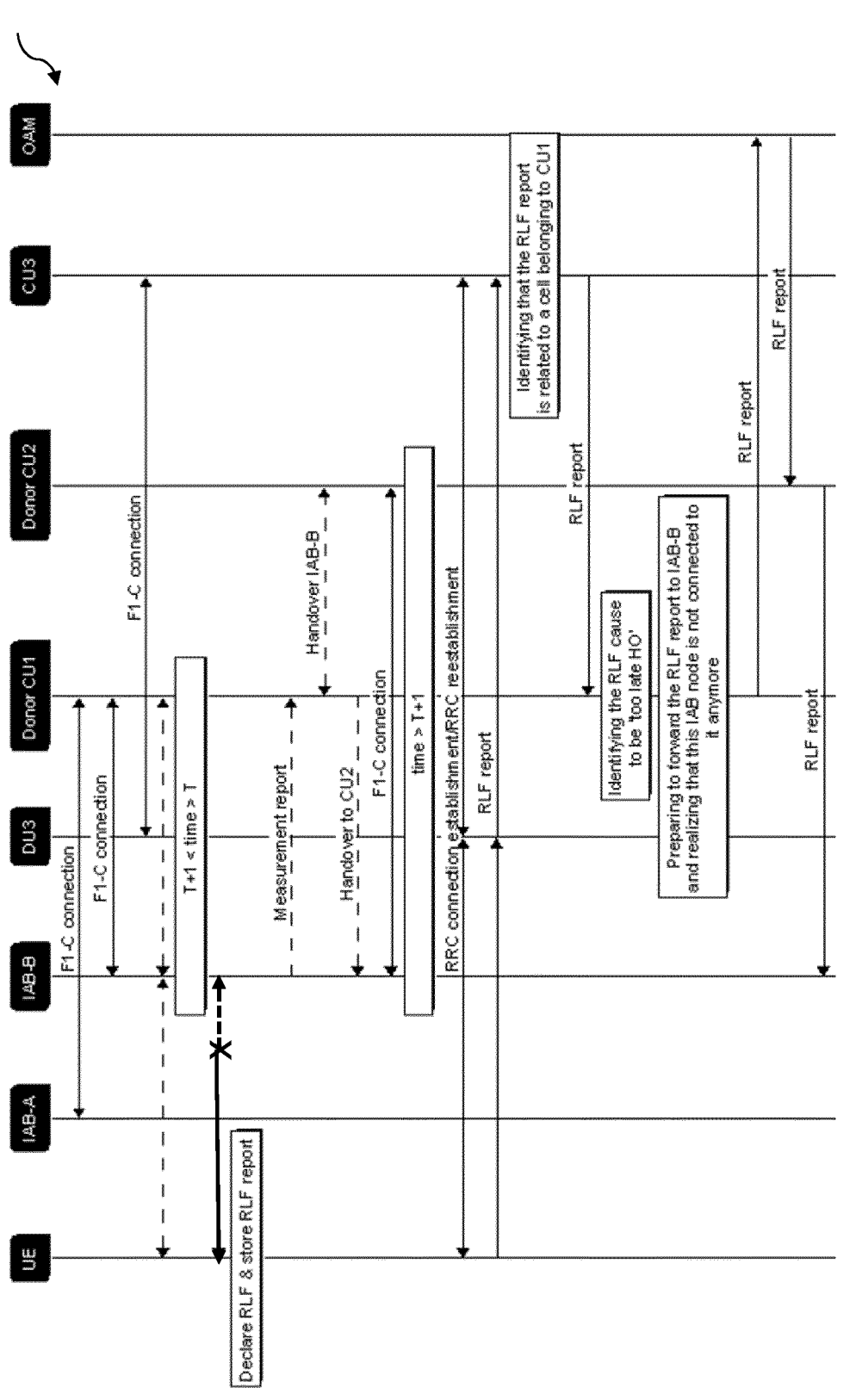
FIG. 14 illustrates the scenario where the source donor CU may use OAM to forward the RLF report.

FIG. 14 illustrates the scenario 40 where the source donor CU may use OAM to forward the RLF report. According to certain embodiments, for example, the source donor CU may send the RLF report to OAM and then delete this RLF report from its internal memory if that is associated to a mobile IAB node that is not connected to the CU. Also, in a particular embodiment, in the message to the OAM, the CU may indicate that the mobile IAB node, for which this RLF report is intended to, is not connected to this CU anymore.

In a particular embodiment, the OAM can then either store this RLF report or forward the RLF report to the 'correct' IAB donor to which the said mobile IAB node is currently connected to (in a method similar to sending the signaling based MDT configuration). This requires the OAM to be updated when an IAB node gets relocated. Thus the OAM must keep track of the current donor CU the IAB node is connected to. In a further particular embodiment, the CU receiving the RLF report could be a donor CU other than the source CU or a CU that is not even a donor CU (i.e., that does not support IAB nodes). From the indicated cell identity in the failure report, the CU can identify that this cell belongs to a mobile IAB node (e.g., network could reserve a certain number of cell identities to IAB node cells), and directly forward the RLF report to the OAM or any other intermediary network node or network function that has communication capability with the CUs.

Using Core Network to Forward the RLF Report (Embodiment E)

Figure 15:
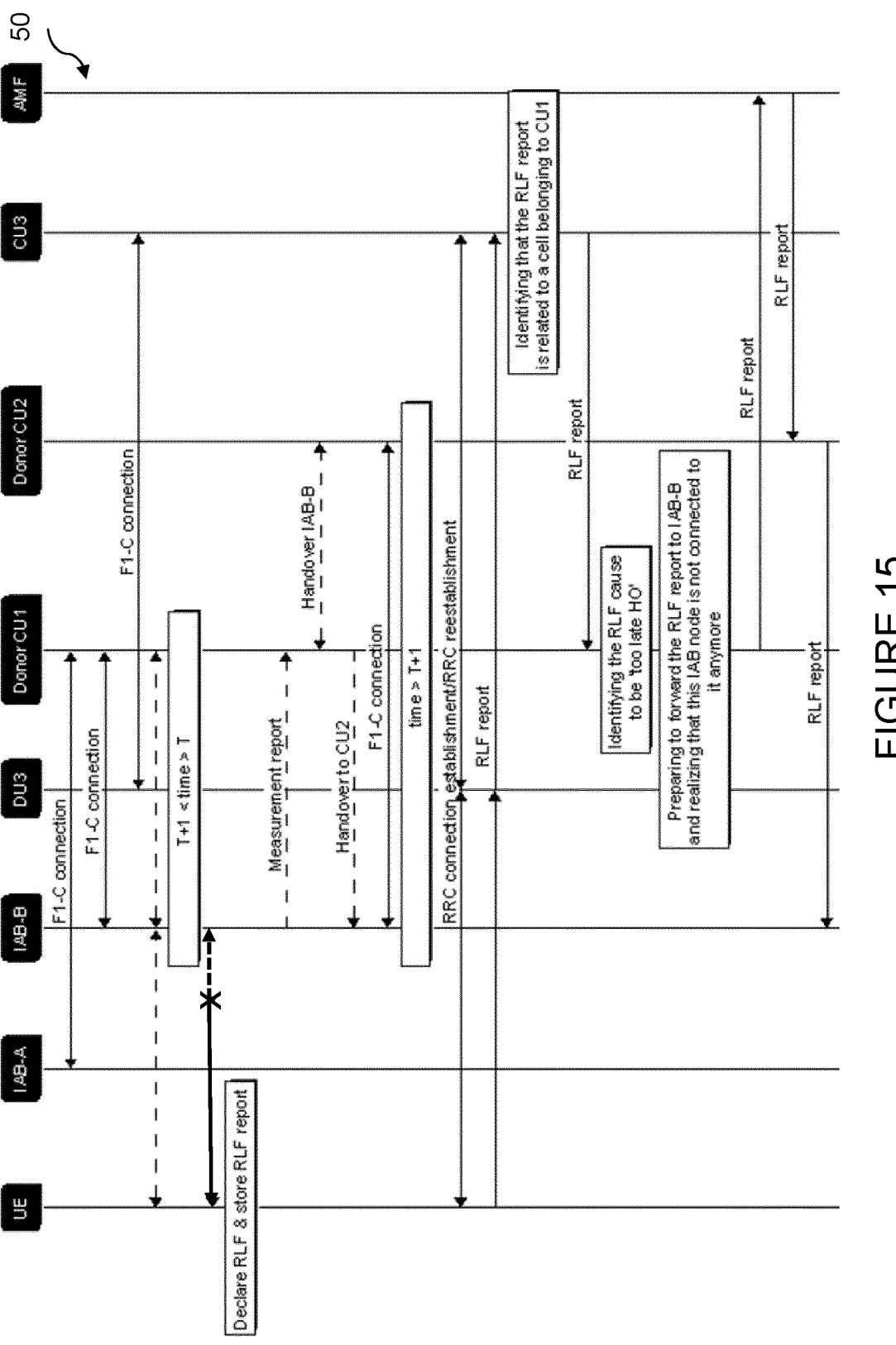
FIG. 15 illustrates an example scenario where the source donor CU may use the core network to forward the RLF report.

According to certain embodiments, the source donor CU may send the RLF report to AMF and then delete the RLF report from its internal memory if that is associated to a mobile IAB node that is not connected to the CU. For example, FIG. 15 illustrates an example scenario 50 where the source donor CU may use the core network to forward the RLF report.

In a particular embodiment, in the message to the AMF, the CU may indicate that the mobile IAB node, for which this RLF report is intended to, is not connected to this CU anymore. The AMF may then either store this RLF report or forward this RLF report to the 'correct' IAB donor to which the said mobile IAB node is currently connected to (in a method similar to sending the signaling based MDT configuration). This particular embodiment may require the AMF to be updated (keep track of) when an IAB node gets relocated (i.e. the current donor CU the IAB node is connected to).

In a further particular embodiment, the CU receiving the report could be a donor CU other than the source CU or a CU that is not even a donor CU (i.e. that does not support IAB nodes). From the indicated cell identity in the failure report, the CU can identify that this cell belongs to a mobile IAB node (e.g., network could reserve a certain number of cell identities to IAB node cells) and directly forward the RLF report to the AMF.

In another particular embodiment, another way for the AMF to identify the current location of the mobile IAB node is based on the identity of the MT of the mobile IAB node i.e., IMSI. So, the AMF or another function/entity in the core network maintains a table associated to the relation between the unique identifier assigned to a SIM card (IMSI) of the MT of the mobile IAB node and the list of cell identities such as, for example, Cell Group Identities (CGIs), that were previously used by the mobile IAB node.

Bi-Casting of the RLF Report Towards the Old CU and the DU by the CU in which the RLF Report is Collected from the UE (Embodiment F)

Figure 16:
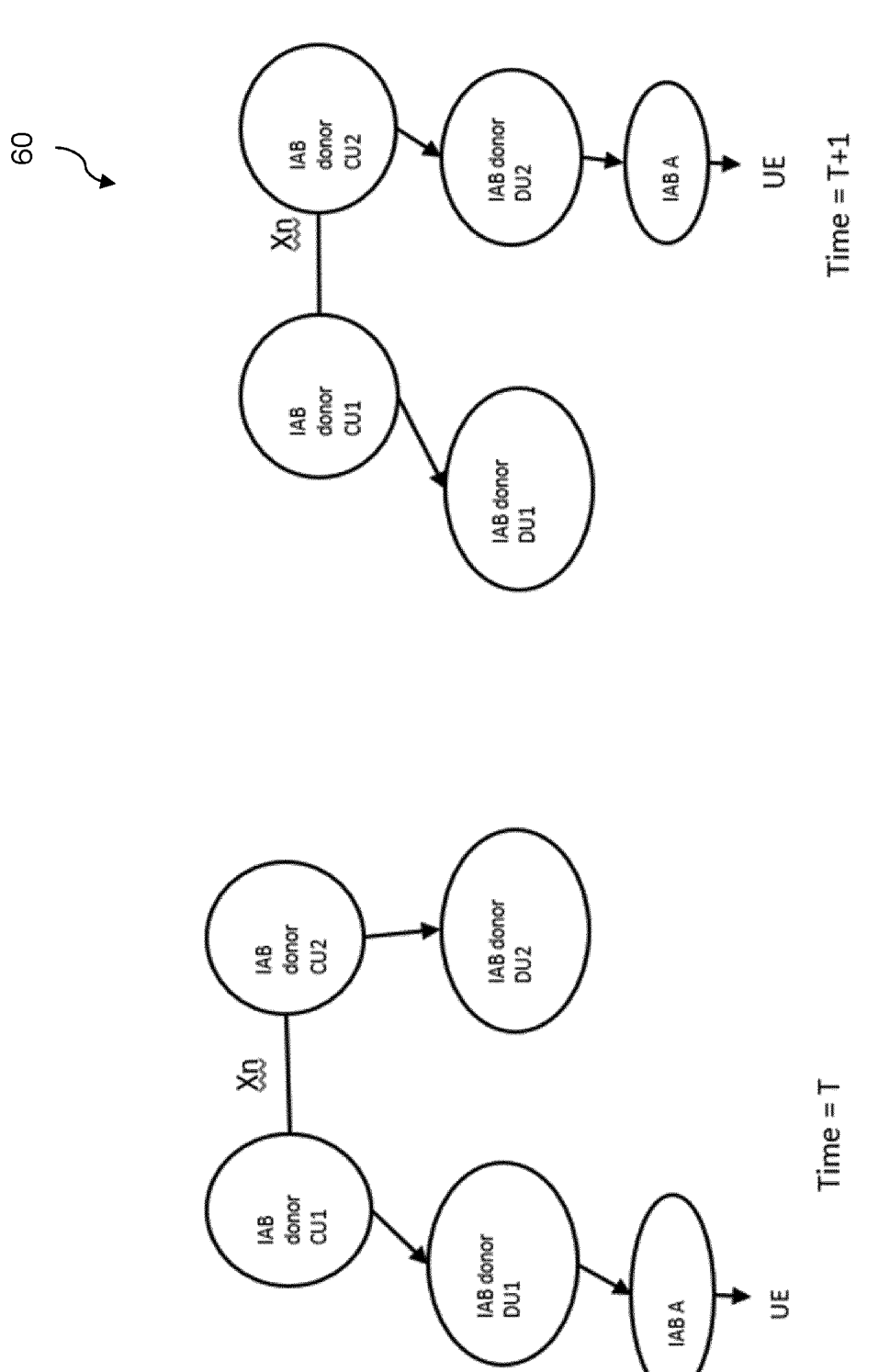
FIG. 16 illustrates an example scenario for bi-casting of the RLF report towards the old CU and the DU by the CU that collects the RLF report.

FIG. 16 illustrates an example scenario 60 for bi-casting of the RLF report towards the old CU and the DU by the CU that collects the RLF report. As depicted, a UE is connected to IAB donor 1 at time=T. In between time=T and time=T+1, the UE declares RLF but the UE cannot find coverage from either the IAB nodes or non IAB nodes to perform re-establishment (i.e., the UE is in a coverage hole, assume a tunnel along a highway/train track wherein there is no coverage from the non IAB nodes and IAB nodes might also stop transmitting sync signals if they experience backhaul RLF for a long time). Then the UE comes back to connected again in the same IAB node which is now in turn connected to IAB donor 2.

In the example scenario of FIG. 16, IAB donor CU2 fetches the RLF report from the UE and forwards it to the old IAB donor CU1. Now the donor CU1 may realize that the associated DU is not connected to it anymore and might use any of the above embodiments (e.g. forwarded back to donor CU2 according to embodiment B). This will create a delay in receiving the RLF report at the IAB A and also increase the network signaling overhead.

For this embodiment to work, the donor CU1 has to store the incoming handover history of its IAB nodes. For example, the donor CU1 may store cells identities used by the IAB node in the previous donor, the corresponding cell identities after the handover, the identity of the previous donor CU, etc. In a particular embodiment, for example, to solve the issue, according to certain embodiments, the CU2 can perform the following procedure:

receiving (X01) the RLF report from the UE;
    identifying (X02) the source CU, CU1, to which the RLF report needs to be forwarded;

identifying (X03) the source IAB node to which the RLF report needs to be forwarded and realizing that such an IAB node, IAB A, is connected to itself;
sending (X04) the RLF report directly to IAB A; and/or
sending (X05) the RLF report to the source donor CU, CU1, and indicating that the RLF report has already forwarded to IAB A (this is because some of the information in the RLF report can also be used by the CU, e.g., to fine tune some handover parameters)

Actions Taken by the CU that Retrieves the RLF Report from the UE (Embodiment G)

According to certain embodiments, other actions may be alternatively or additionally taken by the CU that retrieves the RLF report from the UE. In these embodiments, the CU extracting the RLF/RA report from the UE, which may include IAB donor CU-3 in the examples above, determines whether a certain cell is associated to a DU which corresponds to a mobile IAB node. To do that, the CU-3 or other node may check whether such cell is still the list of the cells which are neighbor of any cell controlled by the CU-3 or which are in the list of cells controlled my neighboring CUs (for which there exist an Xn connection). If the concerned cell is not in such lists, the CU-3 may conclude that such cell is associated to a mobile IAB node.

In another particular embodiment, the CU-3 or another node may get information from the OAM on the cell identities which are associated to mobile IAB nodes. For example, the CU-3 may request the OAM or the AMF node to indicate whether the concerned cell is associated to a mobile IAB node, or the OAM/AMF node may configure the CU-3 with a list of cells identities corresponding to mobile IAB nodes so that the CU-3 can check this list when receiving an RLF/RA report. In a further particular embodiment, the UE itself may include an indication in the RLF/RA report that the associated reports are related to an IAB donor DU. This could be an explicit or an implicit indication (e.g., CGI used might indicate a cell ID space which is reserved for IAB donor DUs).

According to certain embodiments, if the concerned cell is determined to correspond to a mobile IAB node, the CU-3 may:
    discard the associated RLF/RA report;
    forward to the OAM/AMF node the associated RA/RLF report;
        forward the associated RA/RLF report to the neighboring CU to which the concerned cell is currently connected (assuming that the concerned cell is neighbour of any cell controlled by CU-3, or that is controlled by a CU which has Xn connection to CU-3);
    forward the associated RA/RLF report to the neighboring CU to which the concerned cell was handed-over (assuming that the concerned cell has been connected in the past to CU-3 and that CU-3 has still stored in memory such information, e.g. a timer for keeping stored such information is not yet expired or not replace with more recent information); and/or
    forward the associated RA/RLF report to the DU corresponding to the concerned cell if the DU is currently connected to CU-3 or if at the time it connects to it such information is still stored at CU-3.

Figure 17:
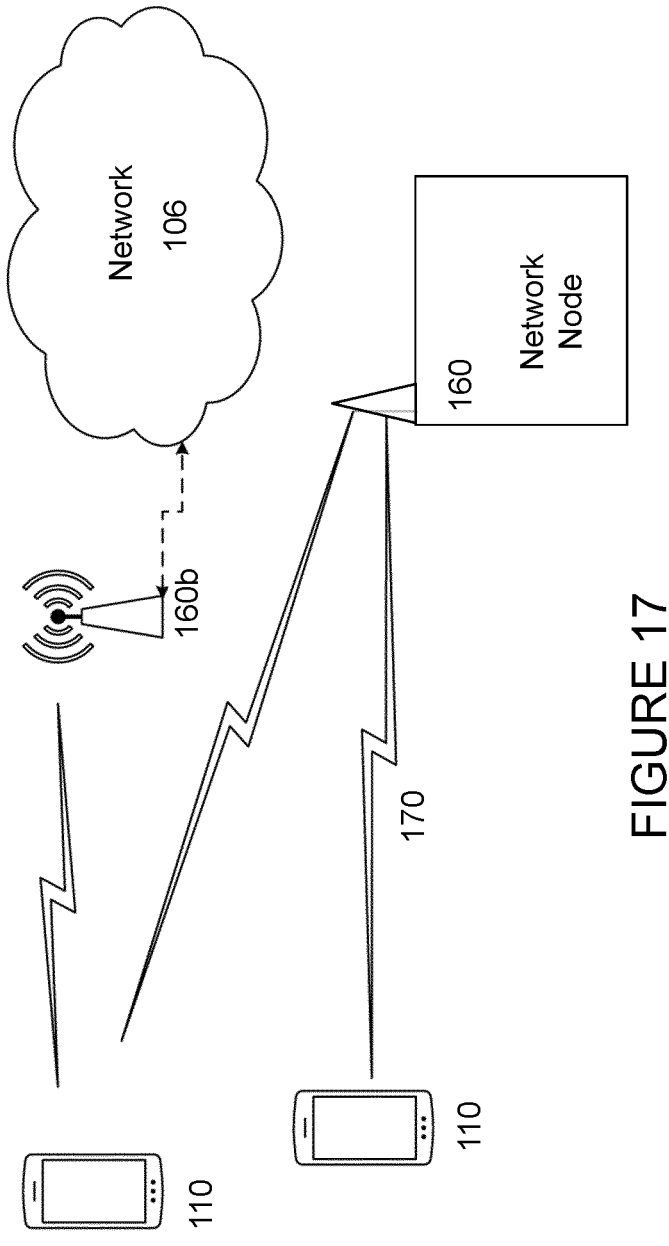
FIG. 17 illustrates an example wireless network, according to certain embodiments.

FIG. 17 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 18:
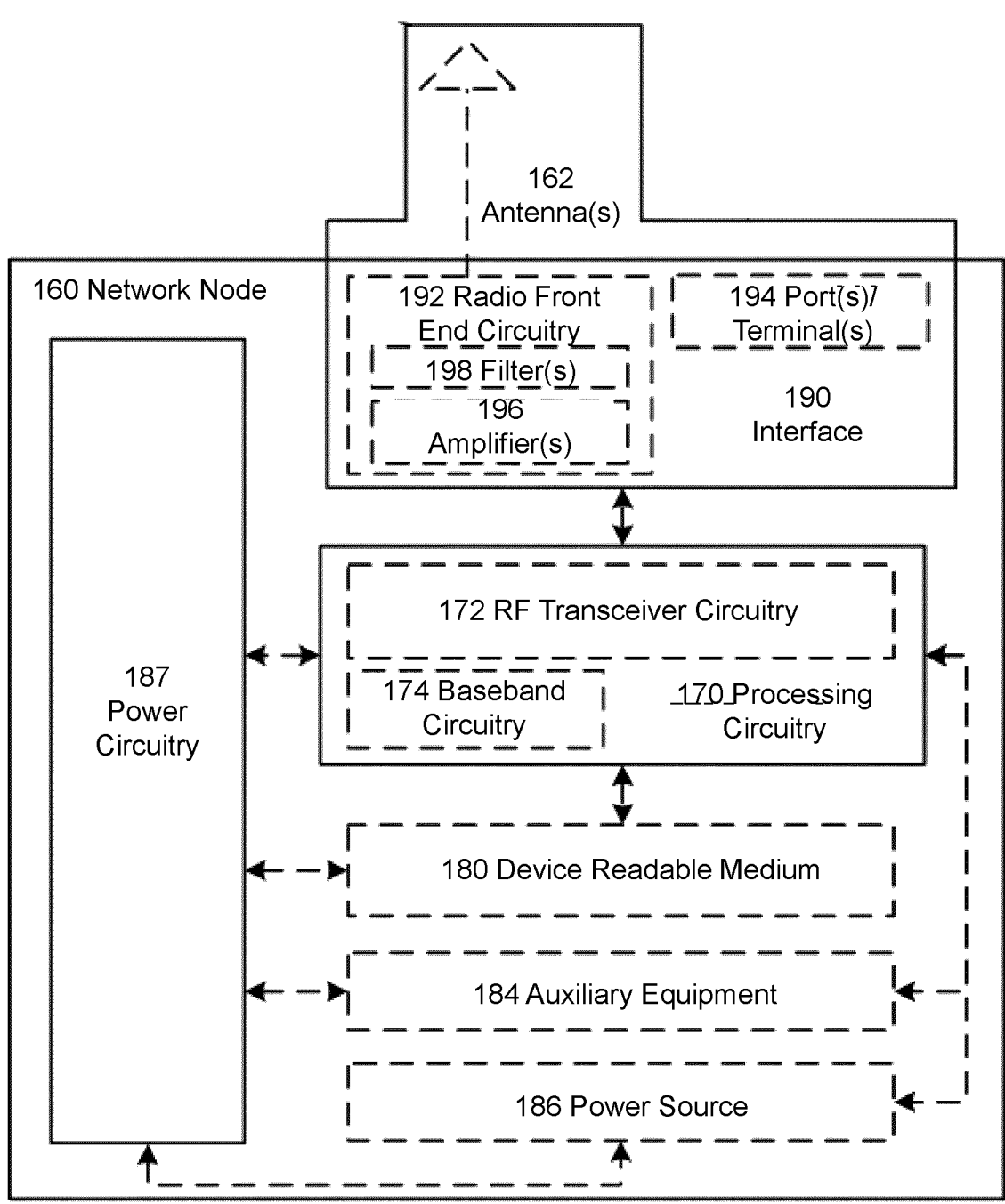
FIG. 18 illustrates an example network node, according to certain embodiments.

FIG. 18 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 160 includes processing circuitry 170, device readable medium 180, interface 190, auxiliary equipment 184, power source 186, power circuitry 187, and antenna 162. Although network node 160 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 18 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 19:
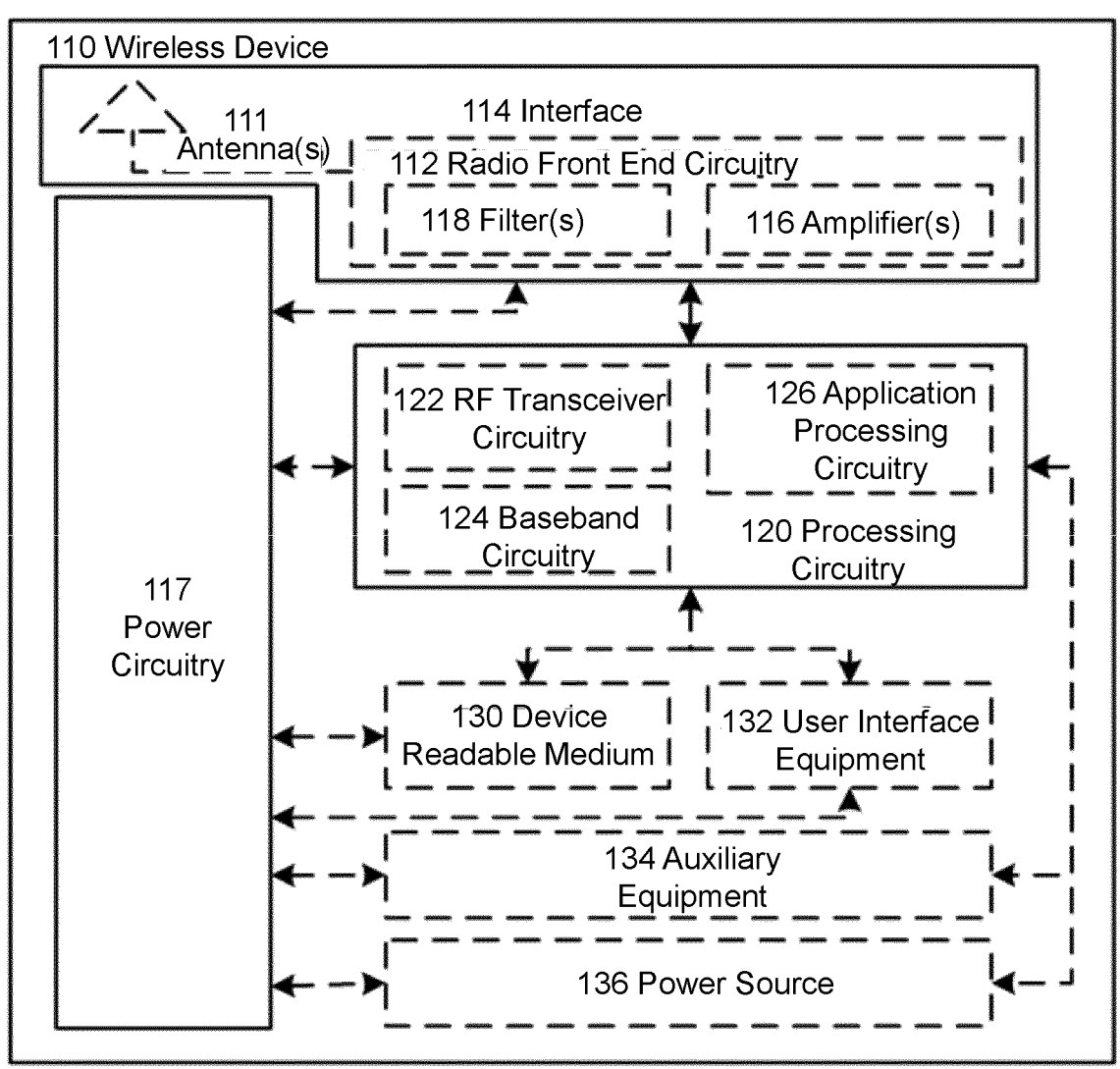
FIG. 19 illustrates an example wireless device, according to certain embodiments.

FIG. 19 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 20:
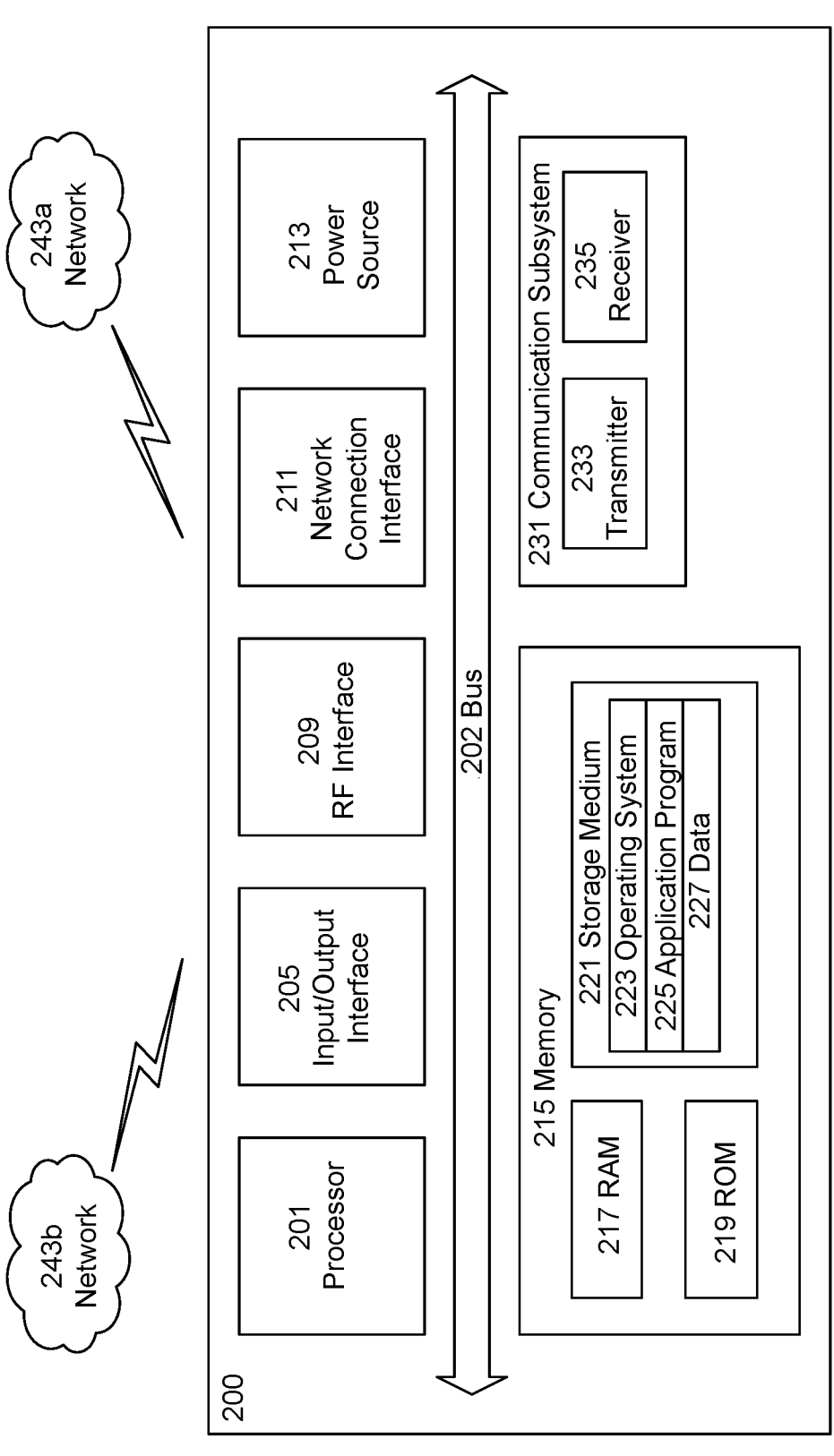
FIG. 20 illustrate an example user equipment, according to certain embodiments.

FIG. 20 illustrates one embodiment of a UE 200 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 18, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 20 is a UE, the components discussed herein are equally applicable to a wireless device, and vice-versa.

In FIG. 20, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 20, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 21:
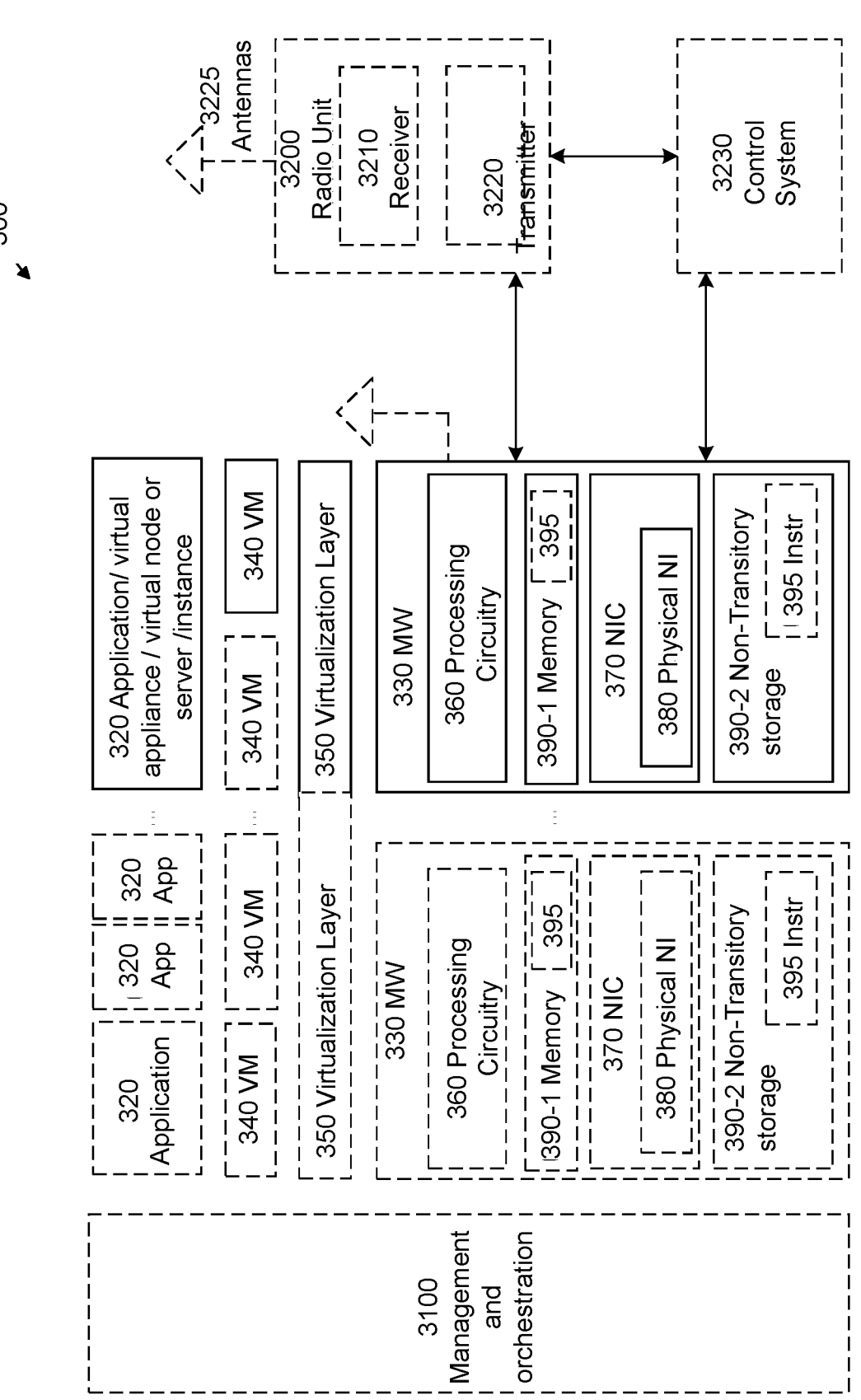
FIG. 21 illustrates a virtualization environment in which functions implemented by some embodiments may be virtualized, according to certain embodiments.

FIG. 21 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 21, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 21.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 22:
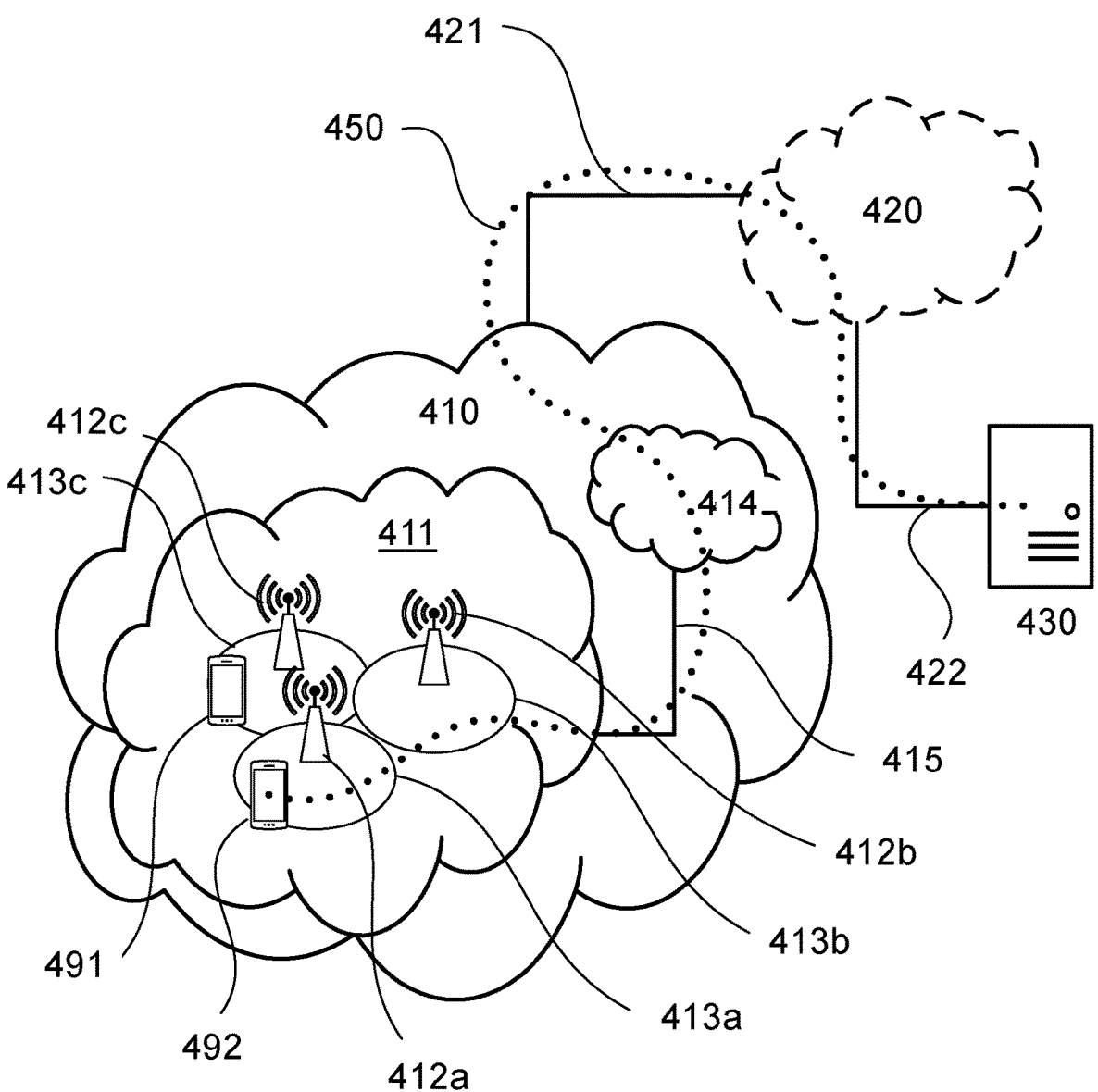
FIG. 22 illustrates a telecommunication network connected via an intermediate network to a host computer, according to certain embodiments.

FIG. 22 illustrates a telecommunication network connected via an intermediate network to a host computer in accordance with some embodiments. With reference to FIG. 22, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 22 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 23:
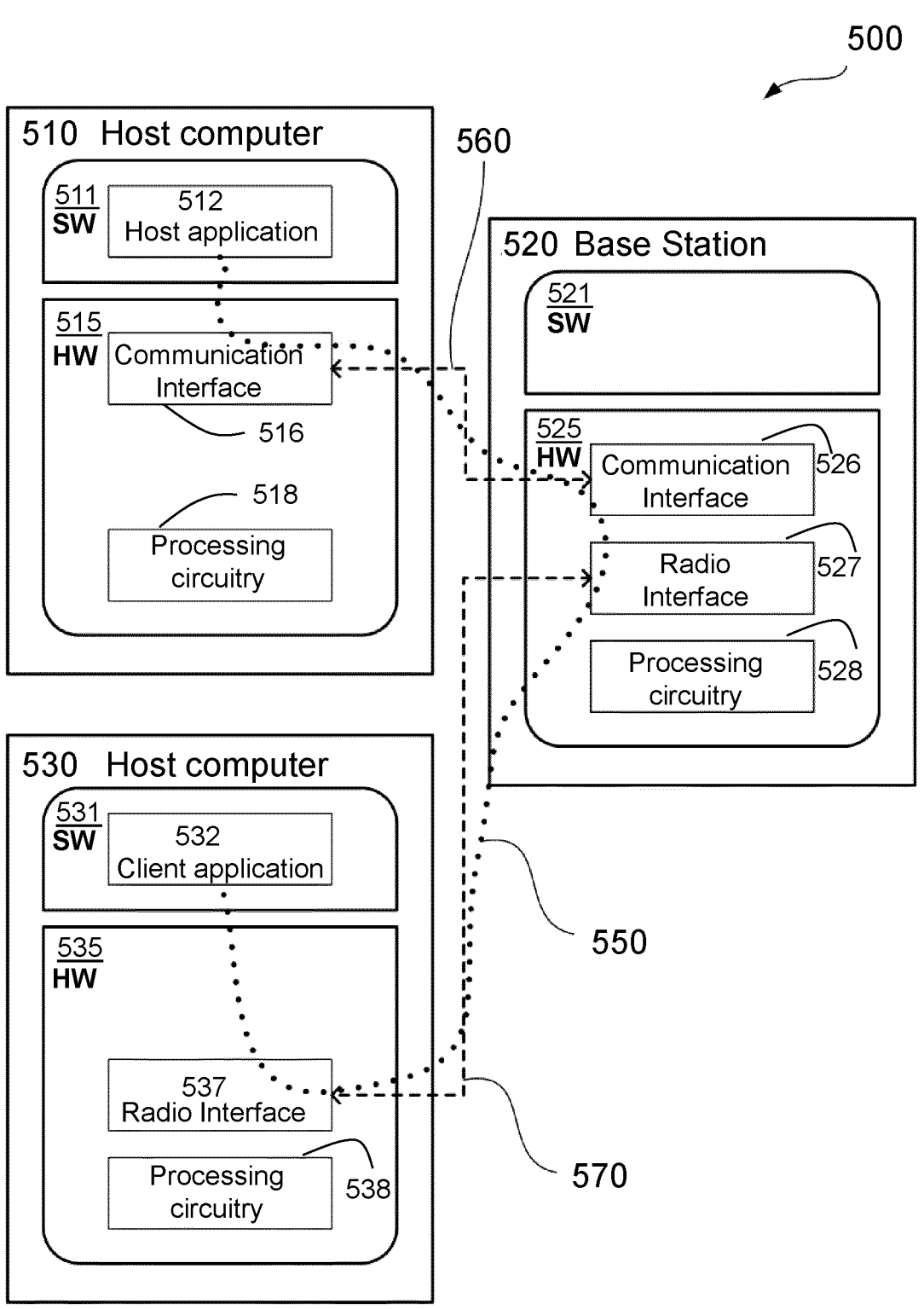
FIG. 23 illustrates a generalized block diagram of a host computer communicating via a base station with a user equipment over a partially wireless connection, according to certain embodiments.

FIG. 23 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 23. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 23) served by base station 520. Communication interface 526 may be configured to facilitate connection 560 to host computer 510. Connection 560 may be direct or it may pass through a core network (not shown in FIG. 23) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 23 may be similar or identical to host computer 430, one of base stations 412a, 412b, 412c and one of UEs 491, 492 of FIG. 22, respectively. This is to say, the inner workings of these entities may be as shown in FIG. 23 and independently, the surrounding network topology may be that of FIG. 22.

In FIG. 23, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 24, 25:
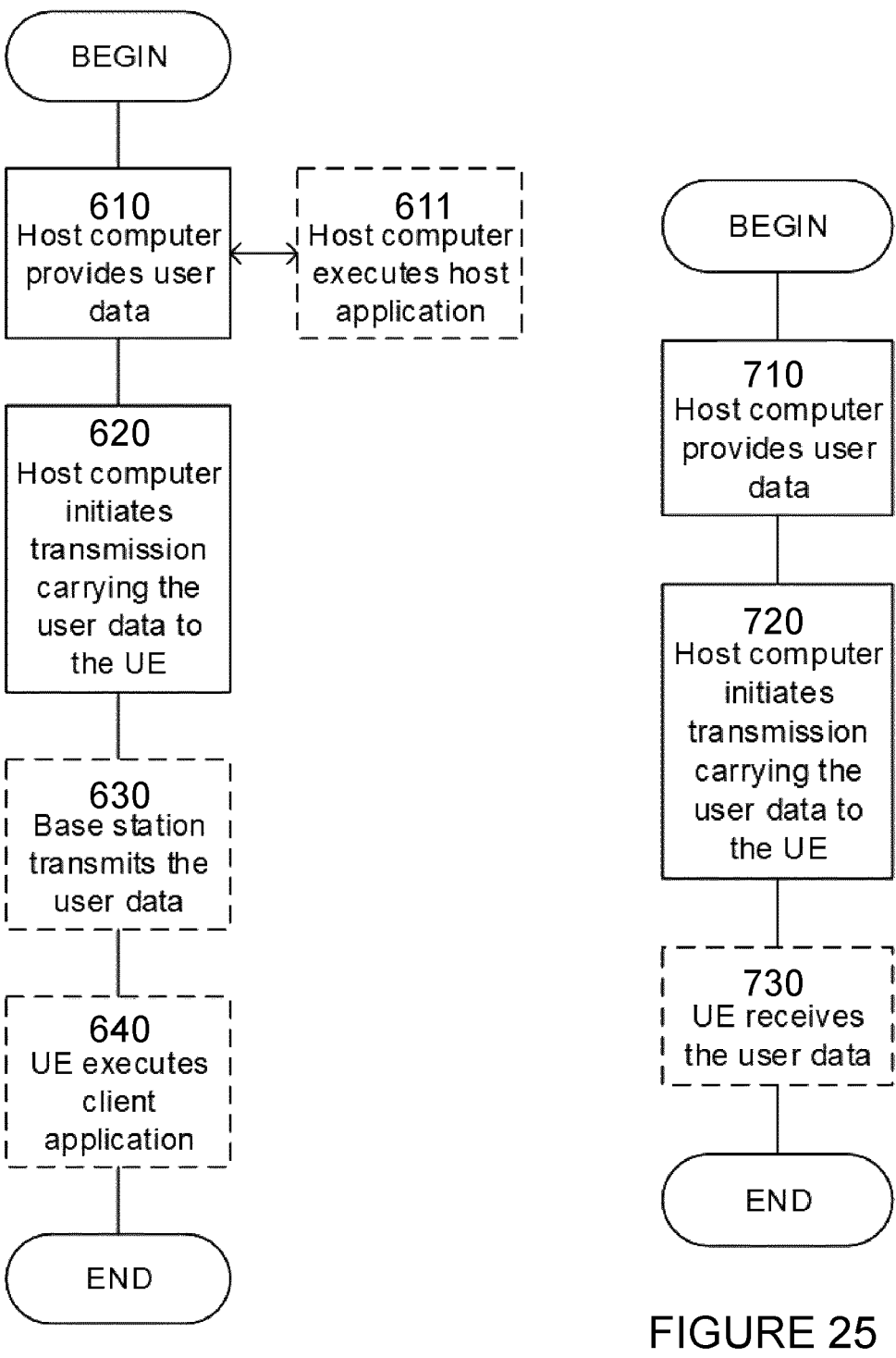
FIG. 24 illustrates a method implemented in a communication system, according to one embodiment.
FIG. 25 illustrates another method implemented in a communication system, according to one embodiment.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 26, 27:
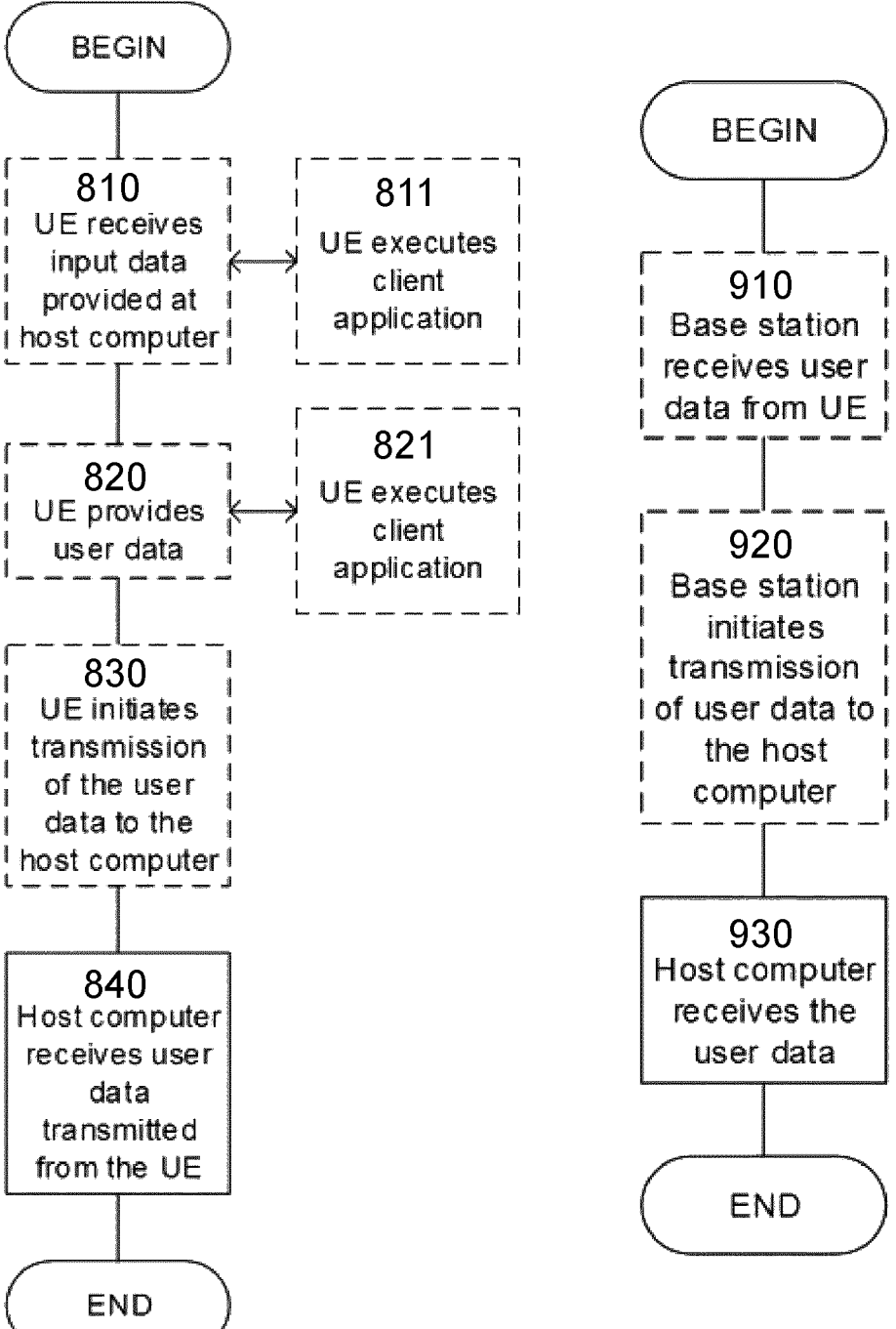
FIG. 26 illustrates another method implemented in a communication system, according to one embodiment.
FIG. 27 illustrates another method implemented in a communication system, according to one embodiment.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

FIG. 28 depicts a method 1000 by a first network node 160, according to certain embodiments. At step 1002, the first network node 160 obtains information related to a radio link failure or radio link recovery associated with a wireless device 110. At step 1004, the first network node 160 determines that the information is related to a radio link failure or radio link recovery associated with a cell associated with a second network node that is not served by the first network node. At step 1006, the first network node 160 takes at least one action in response to determining that the information is related to a radio link failure or radio link recovery associated with the cell associated with the second network node 160 that is not served by the first network node 160.

In a particular embodiment, the first network node is serving as a donor CU for at least one IAB DU node in an IAB network.

In a particular embodiment, the second network node comprises an IAB DU node that is not served by the first network node when the information is obtained.

In a particular embodiment, obtaining the information comprises receiving the information from the wireless device.

In a particular embodiment, the information is received in a message that includes a radio link failure (RLF) report and/or a Random Access (RA) report.

In a particular embodiment, taking the at least one action comprises deleting the information.

In a particular embodiment, taking the at least one action comprises transmitting (i.e., forwarding) the information to a third network node that is currently serving the second network node. In a further particular embodiment, the second network node comprises an IAB DU node, and the third network node comprises a central unit, and the second network node has been handed over from the first network node to the third network node in a handover procedure. In a further particular embodiment, the first network node stores a handover history of the second network node and determines based on the handover history that the second network node has been handed over to the third network node, and the information is transmitted to the third network node based on the handover history indicating that the second network node has been handed over to the third network node.

In a particular embodiment, taking the at least one action includes storing the information, determining that the second network node has been handed over to the first network node, and transmitting the information to the second network node. In a further particular embodiment, the second network node is associated with a unique identifier, and the first network node stores the information as being associated with the unique identifier associated with the second network node, receives a setup message (comprising the unique identifier associated with the second network node) associated with the second network node being handed over the first network node, determines that the information is associated with the second network node based on the setup message comprising the unique identifier associated with the second network node, and transmits the information to the second network node in response to determining that the information is associated with the second network node. In a further particular embodiment, the first network node is associated with a unique identifier, and the first network node receives a setup message (comprising the unique identifier associated with the first network node) associated with the second network node being handed over the first network node, determines that the information is associated with the second network node based on the setup message comprising the unique identifier associated with the first network node, and transmits the information to the second network node in response to determining that the information is associated with the second network node.

In a particular embodiment, taking the at least one action comprises transmitting the information the information to a fourth network node operating as an Operations & Maintenance (OAM) node for forwarding to a fifth network node that is currently serving the second network node.

In a particular embodiment, taking the at least one action includes transmitting a request for handover information to a fourth network node operating as an OAM node, receiving the handover information from the fourth network node, and transmitting the information to the fifth network node. The handover information indicates that the second network node is being served by a fifth network node.

In a particular embodiment, taking the at least one action includes transmitting the information to a core network node for forwarding to a fifth network node that is currently serving the second network node.

In a particular embodiment, taking the at least one action includes transmitting a request for handover information to a core network node, receiving the handover information from the core network node, and transmitting the information to the fifth network node. The handover information indicates that the second network node is being served by a fifth network node.

In a further particular embodiment, the core network node includes an Access and Mobility Management Function (AMF) and/or Mobility Management Entity (MME).

In a particular embodiment, obtaining the information related to the radio link failure or the radio link recovery associated with the wireless device includes receiving the information in a message from the wireless device.

In a particular embodiment, obtaining the information related to the radio link failure or the radio link recovery associated with the wireless device includes receiving the information in a message from a sixth network node serving as a donor CU for the second network node when the radio link failure or radio link recovery associated with the wireless device occurred.

In a particular embodiment, the first network node determines that the second network node is a mobile IAB node, and the at least one action is at least partially taken in response to determining that the second network node is the mobile IAB node.

In a particular embodiment, determining that the second network node is the mobile IAB node includes determining that the cell is not on a list comprising at least one cell that is a neighbor of any cell controlled by the first network node. In a further particular embodiment, determining that the second network node is the mobile IAB node includes determining that the cell is not on a list comprising at least one cell that is controlled by a neighboring network node operating as a CU. In a further particular embodiment, determining that the second network node is the mobile IAB node includes receiving information indicating that the cell is associated with the mobile IAB node from an OAM. In a further particular embodiment, the information received from the OAM comprises a list identifying at least one cell as being associated with a mobile IAB node.

In a further particular embodiment, the first network node transmits a request to the OAM for the information indicating that the cell is associated with the mobile IAB node.

FIG. 29 illustrates a schematic block diagram of a virtual apparatus 1100 in a wireless network (for example, the wireless network shown in FIG. 17). The apparatus may be implemented in a wireless device or network node (e.g., wireless device 110 or network node 160 shown in FIG. 17). Apparatus 1100 is operable to carry out the example method described with reference to FIG. 28 and possibly any other processes or methods disclosed herein. It is also to be understood that the method of FIG. 28 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1110, determining module 1120, taking action module 1130, and any other suitable units of apparatus 1100 to perform corresponding functions according one or more embodiments of the present disclosure.

According to certain embodiments, obtaining module 1110 may perform certain of the obtaining functions of the apparatus 1100. For example, obtaining module 1110 may obtain information related to a radio link failure or radio link recovery associated with a wireless device.

According to certain embodiments, determining module 1120 may perform certain of the determining functions of the apparatus 1100. For example, determining module 1120 may determine that the information is related to a radio link failure or radio link recovery associated with a cell associated with a second network node that is not served by the first network node.

According to certain embodiments, taking action module 1130 may perform certain of the taking action functions of the apparatus 1100. For example, taking action module 1130 may take at least one action in response to determining that the information is related to a radio link failure or radio link recovery associated with the cell associated with the second network node that is not served by the first network node.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 30 depicts another method 1200 by a first network node 160, according to certain embodiments. At step 1202, the first network node 160 receives information related to a radio link failure or radio link recovery associated with a wireless device 110. The information is received from a second network node that is currently serving the wireless device 110. The information is associated with a cell associated with a third network node that previously served the wireless device 110. The third network node is not being served by the second network node. At step 1204, the first network node takes at least one action with respect to the information.

In a particular embodiment, the second network node is serving as a donor central unit (CU) for at least one integrated access and wireless access backhaul (IAB) distributed unit (DU) node in an IAB network, and the third network node comprises an IAB node that is not served by the second network node.

In a particular embodiment, the information is received in a message comprising a radio link failure (RLF) report and/or a Random Access (RA) report.

In a particular embodiment, taking the at least one action includes transmitting the information to a fourth network node that is currently serving the third network node.

In a particular embodiment, the first network node is operating as an Operations & Maintenance (OAM) node.

In a particular embodiment, the first network node is a core network node. In a further particular embodiment, the core network node comprises an Access and Mobility Management Function (AMF) and/or Mobility Management Entity (MME).

In a further particular embodiment, the first network node receives a request for handover information and transmits the handover information to another network node. The handover information indicates that the third network node is being served by a fourth network node.

In a particular embodiment, the third network node is a mobile IAB node, and the at least one action is at least partially taken in response to determining that the third network node is the mobile IAB node.

In a further particular embodiment, the first network node determines that the third network node is the mobile IAB node. In a further particular embodiment, determining that the third network node is the mobile IAB node includes determining that the cell is not on a list comprising at least one cell that is a neighbor of any cell controlled by the second network node. Alternatively, in a further particular embodiment, determining that the third network node is the mobile IAB node comprises determining that the cell is not on a list comprising at least one cell that is controlled by a neighboring network node operating as a CU.

In a particular embodiment, taking the at least one action further includes transmitting, to at least one other network node, information indicating that the cell is associated with a mobile IAB node, where such information includes a list identifying at least one cell as being associated with the mobile IAB node.

In a particular embodiment, taking the at least one action further includes transmitting the information to at least one other network node. In a particular embodiment, the at least one other network node comprises any one or more of:
   the second network node,
   a third network node that previously served the wireless device,
   a core network node,
   a DU currently serving the wireless device,
   a DU that previously served the wireless device,
   an IAB node that previously served the wireless device,
   an IAB node that currently serves the wireless device,
   a CU that previously served the wireless device, and
   a CU that currently serves the wireless device.

FIG. 31 illustrates another schematic block diagram of a virtual apparatus 1300 in a wireless network (for example, the wireless network shown in FIG. 17). The apparatus may be implemented in a wireless device or network node (e.g., wireless device 110 or network node 160 shown in FIG. 17). Apparatus 1300 is operable to carry out the example method described with reference to FIG. 30 and possibly any other processes or methods disclosed herein. It is also to be understood that the method of FIG. 30 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1310, taking action module 1320, and any other suitable units of apparatus 1300 to perform corresponding functions according one or more embodiments of the present disclosure.

According to certain embodiments, receiving module 1310 may perform certain of the receiving functions of the apparatus 1300. For example, receiving module 1310 may receive information related to a radio link failure or radio link recovery associated with a wireless device. The information is received from a second network node that is currently serving the wireless device. The information is associated with a cell associated with a third network node that previously served the wireless device. The third network node is not being served by the second network node.

According to certain embodiments, taking action module 1320 may perform certain of the taking action functions of the apparatus 1300. For example, taking action module 1320 may take at least one action with respect to the information.

FIG. 32 illustrates an example method 1400 by a first network node 160, according to certain embodiments. At step 1402, the first network node 160 obtains information associated with a SON report associated with a wireless device. At step 1404, the first network node 160 determines that the information associated with the SON report is associated with a cell that is not served by the first network node 160. In response to determining that the information associated with the SON report is associated with the cell that is not served by the first network node 160, the first network node 160 takes at least one action that includes deleting the information or transmitting the information to a second network node, at step 1406.

In a particular embodiment, at least one of the following is true: the SON report comprises a link failure report; the link failure report comprises a handover failure report or a RLF report; and the SON report is associated with a Random Access procedure. In some examples, the SON, report contains information related to a previous radio failure or recovery of the wireless device. In some examples, obtaining 1402 the information associated with the SON report comprises obtaining the SON report, or, obtaining the information e.g. the information related to a radio failure or recovery of the wireless device. In some examples, the information relates to a link failure, e.g. a handover failure or a radio link failure. The SON report may be considered as a report comprising any of such information.

In some examples, deleting the information, or transmitting the information, in step 1406, corresponds to deleting the information or transmitting the information in the SON report (e.g. information related to a radio failure or recovery of the wireless device), or deleting or transmitting the SON report.

In a particular embodiment, the first network node 160 is serving as a donor CU for at least one IAB DU node in an IAB network.

In a particular embodiment, the second network node comprises an IAB DU node that was not served by the first network node 160 when the information is obtained, and the second network node is currently serving the cell.

In a particular embodiment, the first network node 160 stores a handover history of at least one additional node in the IAB network and determines, based on the handover history, that the at least one additional network node has been handed over to the second network node. The information is transmitted to the second network node based on the handover history indicating that the at least one additional network node has been handed over to the second network node.

In a further particular embodiment, the second network node was serving the cell when the information was generated.

In a particular embodiment, when obtaining the information, the first network node 160 receives the information from the wireless device 110.

In a particular embodiment, when transmitting the information to the second network node, the first network node 160 stores the information associated with the SON report, determines that the second network node has been handed over to the first network node 160, and transmits the information associated with the SON report to the second network node in response to determining that the second network node has been handed over to the first network node 160.

In a particular embodiment, the second network node is associated with a unique identifier, and the first network node 160 stores the information as being associated with the unique identifier associated with the second network node. The first network node 160 receives a setup message associated with the second network node being handed over to the first network node, and the setup message includes the unique identifier associated with the second network node. Based on the setup message comprising the unique identifier associated with the second network node, the first network node 160 determines that the information is associated with the second network node and transmits the information associated with the SON report to the second network node in response to determining that the information associated with the SON report is associated with the second network node.

In a further particular embodiment, the first network node 160 is associated with a unique identifier. The first network node 160 receives a setup message associated with the second network node being handed over to the first network node 160, and the setup message includes the unique identifier associated with the first network node 160. Based on the setup message including the unique identifier associated with the first network node, the first network node 160 determines that the information is associated with the second network node and transmits the information associated with the SON report to the second network node in response to determining that the information is associated with the second network node.

In a particular embodiment, transmitting the information to the second network node includes transmitting the information to an OAM node for forwarding to a third network node that is currently serving the cell.

In a particular embodiment, transmitting the information to the second network node includes transmitting a request for handover information to an OAM node or a core network node and receiving the handover information from the OAM node or the core network node. The handover information indicates that the cell is being served by a second network node. The first network node transmits the information associated with the SON report to the second network node.

In a particular embodiment, transmitting the information associated with the SON report to the second network node includes transmitting the information associated with the SON report to a core network node for forwarding to at least one additional network In a particular embodiment, the first network node 160 determines that the cell is associated with a mobile IAB node, and the at least one action is at least partially taken in response to determining that the cell is associated with the mobile IAB node.

In a further particular embodiment, determining that the cell is associated with the mobile IAB node includes determining that the cell is not on a list comprising at least one cell that is controlled by a neighboring network node operating as a CU.

In a further particular embodiment, determining that the cell is associated with the mobile IAB node includes receiving information indicating that the cell is associated with the mobile IAB node from an OAM node.

FIG. 33 illustrates another schematic block diagram of a virtual apparatus 1500 in a wireless network (for example, the wireless network shown in FIG. 17). The apparatus may be implemented in a wireless device or network node (e.g., wireless device 110 or network node 160 shown in FIG. 17). Apparatus 1500 is operable to carry out the example method described with reference to FIG. 32 and possibly any other processes or methods disclosed herein. It is also to be understood that the method of FIG. 32 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1510, determining module 1520, taking action module 1530, and any other suitable modules of apparatus 1500 to perform corresponding functions according one or more embodiments of the present disclosure.

According to certain embodiments, obtaining module 1510 may perform certain of the obtaining functions of the apparatus 1500. For example, obtaining module 1510 may obtain information associated with a SON report associated with a wireless device.

According to certain embodiments, determining module 1520 may perform certain of the determining functions of the apparatus 1500. For example, determining module 1520 may determine that the information associated with the SON report is associated with a cell that is not served by the first network node 160.

According to certain embodiments, taking action module 1530 may perform certain of the taking action functions of the apparatus 1500. For example, in response to the information associated with the SON report being associated with the cell that is not served by the first network node 160, taking action module 1520 may take at least one action that includes deleting the information or transmitting the information to a second network node.

FIG. 34 illustrates an example method 1600 by a first network node 160, according to certain embodiments. At step 1602, the first network node receives information associated with a SON report associated with a wireless device 110. The information is received from a donor CU that is currently serving the wireless device 110, and the information is associated with a cell that previously served the wireless device 110 and is not being served by the donor CU. At step 1606, the first network node 160 transmits the information to a second network node.

In a particular embodiment, at least one of the following is true: the SON report comprises a link failure report; the SON report comprises a handover failure report or a radio link failure, RLF report; and the SON report is associated with a Random Access procedure.

In a particular embodiment, the information is associated with an IAB node that is not served by the donor CU.

In a particular embodiment, the second network node comprises a IAB DU node that is currently serving the cell.

In a particular embodiment, the first network node 160 is operating as an OAM node or a core network node comprising an AMF and/or MME.

In a particular embodiment, the first network node 160 receives, from the second network node, a request for handover information. The information is transmitted to the second network node in response to the request, and the information indicates that the cell is being served by a third network node.

In a further particular embodiment, the cell is associated with a mobile IAB node, and the information is transmitted to the second network node in response to determining that the cell is associated with the mobile IAB node.

In a further particular embodiment, determining that the cell is associated with the mobile IAB node comprises determining that the cell is not on a list comprising at least one cell that is controlled by a neighboring network node operating as a CU.

In a particular embodiment, the information associated with the SON report indicates that the cell is associated with the mobile IAB node.

In a further particular embodiment, the information associated with the SON report comprises a list identifying at least one cell as being associated with the mobile IAB node.

In a particular embodiment, the second network node includes any one or more of: a network node that previously served the wireless device, a core network node, a DU currently serving the wireless device, a DU that previously served the wireless device, an IAB node that previously served the wireless device, an IAB node that currently serves the wireless device, a donor CU that previously served the wireless device, and a CU that currently serves the wireless device.

FIG. 35 illustrates another schematic block diagram of a virtual apparatus 1700 in a wireless network (for example, the wireless network shown in FIG. 17). The apparatus may be implemented in a wireless device or network node (e.g., wireless device 110 or network node 160 shown in FIG. 17). Apparatus 1700 is operable to carry out the example method described with reference to FIG. 34 and possibly any other processes or methods disclosed herein. It is also to be understood that the method of FIG. 34 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1710, transmitting module 1720, and any other suitable modules of apparatus 1700 to perform corresponding functions according one or more embodiments of the present disclosure.

According to certain embodiments, receiving module 1710 may perform certain of the receiving functions of the apparatus 1700. For example, receiving module 1710 may receive information related to a SON report associated with a wireless device. The information is received from a donor CU that is currently serving the wireless device, and the information is associated with a cell that previously served the wireless device and is not being served by the donor CU.

According to certain embodiments, transmitting module 1720 may perform certain of the transmitting functions of the apparatus 1700. For example, transmitting module 1720 may transmit the information to a second network node.

Example Embodiments

Group A1 Embodiments

Example Embodiment 1. A method performed by a first network node, the method comprising: obtaining information related to a radio link failure or radio link recovery associated with a wireless device; determining that the information is related to a radio link failure or radio link recovery associated with a cell associated with a second network node that is not served by the first network node; and taking at least one action in response to determining that the information is related to a radio link failure or radio link recovery associated with the cell associated with the second network node that is not served by the first network node.

Example Embodiment 2. The method of Embodiment 1, wherein the first network node is serving as a donor central unit (CU) for at least one integrated access and wireless access backhaul (IAB) distributed unit (DU) node in an IAB network.

Example Embodiment 3. The method of any one of Embodiments 1 to 2, wherein the second network node comprises an IAB DU node that is not served by the first network node when the information is obtained.

Example Embodiment 4A. The method of any one of Embodiments 1 to 3, wherein obtaining the information comprises receiving the information from the wireless device.

Example Embodiment 4B. The method of any one of Embodiments 1 to 4A, wherein the information is received in a message comprising a radio link failure (RLF) report and/or a Random Access (RA) report.

Example Embodiment 5. The method of any one of Embodiments 1 to 4B, wherein taking the at least one action comprises deleting the information.

Example Embodiment 6. The method of any one of Embodiments 1 to 5, wherein taking the at least one action comprises transmitting (i.e., forwarding) the information to a third network node that is currently serving the second network node.

Example Embodiment 7. The method of Embodiment 6, wherein the second network node comprises an IAB DU node and the third network node comprises a central unit, the second network node having been handed over from the first network node to the third network node in a handover procedure.

Example Embodiment 8. The method of any one of Embodiments 6 to 7, further comprising: storing a handover history of the second network node; and determining based on the handover history that the second network node has been handed over to the third network node, and wherein the information is transmitted to the third network node based on the handover history indicating that the second network node has been handed over to the third network node.

Example Embodiment 9. The method of any one of Embodiments 1 to 8, wherein taking the at least one action comprises: storing the information; determining that the second network node has been handed over to the first network node; and transmitting the information to the second network node.

Example Embodiment 10. The method of Embodiment 9, wherein the second network node is associated with a unique identifier, and wherein the method further comprises: storing the information as being associated with the unique identifier associated with the second network node; receiving a setup message associated with the second network node being handed over the first network node, the setup message comprising the unique identifier associated with the second network node; and based on the setup message comprising the unique identifier associated with the second network node, determining that the information is associated with the second network node; and transmitting the information to the second network node in response to determining that the information is associated with the second network node.

Example Embodiment 11. The method of Embodiment 9, wherein the first network node is associated with a unique identifier, and wherein the method further comprises: receiving a setup message associated with the second network node being handed over the first network node, the setup message comprising the unique identifier associated with the first network node; and based on the setup message comprising the unique identifier associated with the first network node, determining that the information is associated with the second network node; and transmitting the information to the second network node in response to determining that the information is associated with the second network node.

Example Embodiment 12. The method of any one of Embodiments 1 to 11, wherein taking the at least one action comprises transmitting the information the information to a fourth network node operating as an Operations & Maintenance (OAM) node for forwarding to a fifth network node that is currently serving the second network node.

Example Embodiment 13. The method of any one of Embodiments 1 to 12, wherein taking the at least one action comprises: transmitting a request for handover information to a fourth network node operating as an OAM node; receiving the handover information from the fourth network node, the handover information indicating that the second network node is being served by a fifth network node; and transmitting the information to the fifth network node.

Example Embodiment 14. The method of any one of Embodiments 1 to 13, wherein taking the at least one action comprises transmitting the information to a core network node for forwarding to a fifth network node that is currently serving the second network node.

Example Embodiment 15. The method of any one of Embodiments 1 to 14, wherein taking the at least one action comprises: transmitting a request for handover information to a core network node; receiving the handover information from the core network node, the handover information indicating that the second network node is being served by a fifth network node; and transmitting the information to the fifth network node.

Example Embodiment 16. The method of any one of Embodiments 14 to 15, wherein the core network node comprises an Access and Mobility Management Function (AMF) and/or Mobility Management Entity (MME).

Example Embodiment 17. The method of any one of Embodiments 1 to 16, wherein obtaining the information related to the radio link failure or the radio link recovery associated with the wireless device comprises receiving the information in a message from the wireless device.

Example Embodiment 18. The method of any one of Embodiments 1 to 16, wherein obtaining the information related to the radio link failure or the radio link recovery associated with the wireless device comprises receiving the information in a message from a sixth network node serving as a donor CU for the second network node when the radio link failure or radio link recovery associated with the wireless device occurred.

Example Embodiment 19. The method of any one of Embodiments 1 to 17, further comprising determining that the second network node is a mobile IAB node, and wherein the at least one action is at least partially taken in response to determining that the second network node is the mobile IAB node.

Example Embodiment 20. The method of Embodiment 19, wherein determining that the second network node is the mobile IAB node comprises determining that the cell is not on a list comprising at least one cell that is a neighbor of any cell controlled by the first network node.

Example Embodiment 21. The method of Embodiment 19, wherein determining that the second network node is the mobile IAB node comprises determining that the cell is not on a list comprising at least one cell that is controlled by a neighboring network node operating as a CU.

Example Embodiment 22. The method of Embodiment 19, wherein determining that the second network node is the mobile IAB node comprises receiving information indicating that the cell is associated with the mobile IAB node from an OAM.

Example Embodiment 23. The method of Embodiment 22, wherein the information received from the OAM comprises a list identifying at least one cell as being associated with a mobile IAB node.

Example Embodiment 24. The method of any one of Embodiments 22 to 23, further comprising transmitting a request to the OAM for the information indicating that the cell is associated with the mobile IAB node.

Example Embodiment 25. A first network node comprising processing circuitry configured to perform any of the steps or operations of Embodiments 1 to 24.

Example Embodiment 26. A computer program comprising instructions which when executed on a computer perform any of the methods of Embodiments 1 to 24.

Example Embodiment 27. A computer program product comprising computer program, the computer program comprising instructions which when executed on a computer perform any of the methods of Embodiments 1 to 24.

Example Embodiment 28. A non-transitory computer readable medium storing instructions which when executed by a computer perform any of the methods of Embodiments 1 to 24.

Group A2 Embodiments

Example Embodiment 29. A method performed by a first network node (OAM, AMF, core network node), the method comprising: receiving information related to a radio link failure or radio link recovery associated with a wireless device, the information being received from a second network node (CU3) that is currently serving the wireless device, the information being associated with a cell associated with a third network node (IAB B) that previously served the wireless device, the third network node not being served by the second network node; and taking at least one action with respect to the information.

Example Embodiment 30. The method of Embodiment 29, wherein the second network node is serving as a donor central unit (CU) for at least one integrated access and wireless access backhaul (IAB) distributed unit (DU) node in an IAB network, and wherein the third network node comprises an IAB node that is not served by the second network node.

Example Embodiment 31. The method of any one of Embodiments 29 to 30, wherein the information is received in a message comprising a radio link failure (RLF) report and/or a Random Access (RA) report.

Example Embodiment 32. The method of any one of Embodiments 29 to 31, wherein taking the at least one action comprises transmitting the information to a fourth network node that is currently serving the third network node.

Example Embodiment 33. The method of any one of Embodiments 29 to 32, wherein the first network node is operating as an Operations & Maintenance (OAM) node.

Example Embodiment 34. The method of any one of Embodiments 29 to 32, wherein the first network node is a core network node.

Example Embodiment 35. The method of Embodiment 34, wherein the core network node comprises an Access and Mobility Management Function (AMF) and/or Mobility Management Entity (MME).

Example Embodiment 36. The method of any one of Embodiments 33 to 35, further comprising: receiving a request for handover information; transmitting the handover information to another network node, the handover information indicating that the third network node is being served by a fourth network node.

Example Embodiment 37. The method of any one of Embodiments 1 to 17, wherein the third network node is a mobile IAB node, and wherein the at least one action is at least partially taken in response to determining that the third network node is the mobile IAB node.

Example Embodiment 38. The method of Embodiment 37, further comprising determining that the third network node is the mobile IAB node.

Example Embodiment 39. The method of Embodiment 38, wherein determining that the third network node is the mobile IAB node comprises determining that the cell is not on a list comprising at least one cell that is a neighbor of any cell controlled by the second network node.

Example Embodiment 40. The method of Embodiment 38, wherein determining that the third network node is the mobile IAB node comprises determining that the cell is not on a list comprising at least one cell that is controlled by a neighboring network node operating as a CU.

Example Embodiment 41. The method of any one of Embodiments 29 to 40, wherein taking the at least one action further comprising transmitting, to at least one other network node, information indicating that the cell is associated with a mobile IAB node.

Example Embodiment 42. The method of Embodiment 41, wherein the information comprises a list identifying at least one cell as being associated with the mobile IAB node.

Example Embodiment 43. The method of any one of Embodiments 29 to 42, wherein taking the at least one action further comprising transmitting the information to at least one other network node.

Example Embodiment 44. The method of any one of Embodiments 41 to 43, wherein the at least one other network node comprises any one or more of: the second network node, a third network node that previously served the wireless device, a core network node, a DU currently serving the wireless device, a DU that previously served the wireless device, an IAB node that previously served the wireless device, an IAB node that currently serves the wireless device, a CU that previously served the wireless device, and a CU that currently serves the wireless device.

Example Embodiment 45. A first network node comprising processing circuitry configured to perform any of the steps or operations of Embodiments 29 to 44.

Example Embodiment 46. A computer program comprising instructions which when executed on a computer perform any of the methods of Embodiments 29 to 44.

Example Embodiment 47. A computer program product comprising computer program, the computer program comprising instructions which when executed on a computer perform any of the methods of Embodiments 29 to 44.

Example Embodiment 48. A non-transitory computer readable medium storing instructions which when executed by a computer perform any of the methods of Embodiments 29 to 44.

Group B Embodiments

Example Embodiment 49. A network node comprising: processing circuitry configured to perform any of the steps of any of the Group A1 and A2 embodiments; power supply circuitry configured to supply power to the wireless device.

Example Embodiment 50. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group A1 and A2 embodiments.

Example Embodiment 51. The communication system of the pervious embodiment further including the network node.

Example Embodiment 52. The communication system of the previous 2 embodiments, further including the wireless device, wherein the wireless device is configured to communicate with the network node.

Example Embodiment 53. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 54. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group A1 and A2 embodiments.

Example Embodiment 55. The method of the previous embodiment, further comprising, at the network node, transmitting the user data.

Example Embodiment 56. The method of the previous 2 embodiments, wherein the user data is provided at the host computer by executing a host application, the method further comprising, at the wireless device, executing a client application associated with the host application.

Example Embodiment 57. A wireless device configured to communicate with a network node, the wireless device comprising a radio interface and processing circuitry configured to performs the of the previous 3 embodiments.

Example Embodiment 58. The communication system of the previous embodiment, wherein the cellular network further includes a network node configured to communicate with the wireless device.

Example Embodiment 59. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 60. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group A1 and A2 embodiments.

Example Embodiment 61. The communication system of the previous embodiment further including the network node.

Example Embodiment 62. The communication system of the previous 2 embodiments, further including the wireless device, wherein the wireless device is configured to communicate with the network node.

Example Embodiment 63. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 64. The method of any of the previous embodiments, wherein the network node comprises a base station.

Example Embodiment 65. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a first network node serving as a donor central unit, CU, for at least one Integrated Access and Backhaul, IAB, distributed unit, DU, node in an IAB network, the method comprising:

obtaining information associated with a Self Organizing Network, SON, report associated with a wireless device;

determining, by the first network node serving as the donor CU for the IAB DU node in the IAB network, that the information associated with the SON report is associated with a cell that is not served by the first network node;

determining that the cell is associated with a mobile IAB node; and in response to determining that the information associated with the SON report is associated with the cell that is not served by the first network node and in response to determining that the cell is associated with the mobile IAB node, taking at least one action comprising:

deleting the information; or transmitting the information to a second network node.

2. The method of claim 1, wherein at least one of:

the SON report comprises a link failure report;

the link failure report comprises a handover failure report or a radio link failure, RLF, report; and the SON report is associated with a Random Access procedure.

3. The method of claim 1, wherein the second network node comprises an IAB DU node that was not served by the first network node when the information is obtained, and wherein the second network node is currently serving the cell; and, further comprising:

storing a handover history of at least one additional node in the IAB network; and

determining based on the handover history that the at least one additional network node has been handed over to the second network node, and wherein the information is transmitted to the second network node based on the handover history indicating that the at least one additional network node has been handed over to the second network node.

4. The method of claim 1, wherein transmitting the information associated with the SON report to the second network node comprises transmitting the information associated with the SON report to a core network node for forwarding to at least one additional network.

5. A first network node serving as a donor central unit, CU, for at least one Integrated Access and Backhaul, IAB, distributed unit, DU, node in an IAB network, the first network node comprising:

processing circuitry configured to:

obtain information associated with a Self Organizing Network, SON, report associated with a wireless device;

determine that the information associated with the SON report is associated with a cell that is not served by the first network node;

determining that the cell is associated with a mobile IAB node; and in response to determining that the information associated with the SON report is associated with the cell that is not served by the first network node and in response to determining that the cell is associated with a mobile IAB, take at least one action comprising:

deleting the information; or transmitting the information to a second network node.

6. The first network node of claim 5, wherein at least one of:

the SON report comprises a link failure report;

the link failure report comprises a handover failure report or a radio link failure, RLF, report; and the SON report is associated with a Random Access procedure.

7. The first network node of claim 5, wherein the second network node comprises an IAB DU node that was not served by the first network node when the information is obtained, and wherein the second network node is currently serving the cell.

8. The first network node of claim 5, wherein the processing circuitry is configured to:

store a handover history of at least one additional node in the IAB network; and determine based on the handover history that the at least one additional network node has been handed over to the second network node, and wherein the information is transmitted to the second network node based on the handover history indicating that the at least one additional network node has been handed over to the second network node.

9. The first network node of claim 5, wherein when transmitting the information to the second network node the processing circuitry is configured to:

transmit a request for handover information to an OAM node or a core network node;

receive the handover information from the OAM node or the core network node, the handover information indicating that the cell is being served by a second network node; and transmit the information associated with the SON report to the second network node.

10. The first network node of claim 5, wherein when transmitting the information associated with the SON report to the second network node the processing circuitry is configured to transmit the information associated with the SON report to a core network node for forwarding to at least one additional network.

*　*　*　*　*